US011996756B2

(12) United States Patent
Nakamatsu et al.

(10) Patent No.: US 11,996,756 B2
(45) Date of Patent: May 28, 2024

(54) MOTOR UNIT

(71) Applicant: NIDEC CORPORATION, Kyoto (JP)

(72) Inventors: Shuhei Nakamatsu, Kyoto (JP); Tsubasa Tamura, Kyoto (JP); Hitoshi Kuroyanagi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 289 days.

(21) Appl. No.: 17/436,587

(22) PCT Filed: Jan. 10, 2020

(86) PCT No.: PCT/JP2020/000653
§ 371 (c)(1),
(2) Date: Sep. 3, 2021

(87) PCT Pub. No.: WO2020/179217
PCT Pub. Date: Sep. 10, 2020

(65) Prior Publication Data
US 2022/0173639 A1    Jun. 2, 2022

(30) Foreign Application Priority Data

Mar. 6, 2019 (JP) .................................. 2019-040863
Apr. 11, 2019 (JP) .................................. 2019-075237
Jun. 13, 2019 (JP) .................................. 2019-110648

(51) Int. Cl.
*H02K 5/22*     (2006.01)
*B60L 50/51*    (2019.01)
(Continued)

(52) U.S. Cl.
CPC ............... *H02K 5/22* (2013.01); *B60L 50/51* (2019.02); *H02K 1/32* (2013.01); *H02K 5/20* (2013.01);
(Continued)

(58) Field of Classification Search
CPC ...... H02K 11/0094; H02K 11/33; H02K 3/51; H02K 3/50; H02K 3/28; H02K 5/225; H02K 5/04; H02K 5/24
See application file for complete search history.

(56) References Cited

U.S. PATENT DOCUMENTS 6,201,365 B1    3/2001 Hara et al.
6,533,696 B1    3/2003 Takenaka et al.
(Continued)

FOREIGN PATENT DOCUMENTS

JP    2001119898 A    4/2001
JP    2001145320 A    5/2001
(Continued)

OTHER PUBLICATIONS

International Search Report in PCT/JP2020/00653, dated Mar. 24, 2020. 6pp.

*Primary Examiner* — Bryan R Perez
(74) *Attorney, Agent, or Firm* — HAUPTMAN HAM, LLP

(57) ABSTRACT

Provided is a motor unit including: a motor that rotates about a motor axis; a gear unit connected to the motor; an inverter that controls a current to be supplied to the motor; and a housing having a motor housing portion that houses the motor, an inverter housing portion that houses the inverter, and a gear housing portion that houses the gear unit. The inverter housing portion is supported by the motor housing portion and the gear housing portion. The housing includes a housing body that is a single member, the housing body including: a first wall portion that also serves as a side wall of each of the inverter housing portion and the motor housing portion; and a second wall portion that also serves as a side wall of each of the inverter housing portion and the gear housing portion.

9 Claims, 12 Drawing Sheets

(51) Int. Cl.
  *H02K 1/32* (2006.01)
  *H02K 5/20* (2006.01)
  *H02K 7/116* (2006.01)
  *H02K 9/19* (2006.01)
  *H02K 9/193* (2006.01)
  *H02K 11/30* (2016.01)
  *H02K 11/33* (2016.01)

(52) U.S. Cl.
  CPC ............ *H02K 5/203* (2021.01); *H02K 5/225* (2013.01); *H02K 7/116* (2013.01); *H02K 9/19* (2013.01); *H02K 9/193* (2013.01); *H02K 11/30* (2016.01); *H02K 11/33* (2016.01); *H02K 2205/09* (2013.01)

(56) References Cited

U.S. PATENT DOCUMENTS

| | | | |
|---|---|---|---|
| 9,358,870 B2 * | 6/2016 | Hotta | ........................ B60K 6/48 |
| 10,253,763 B2 | 4/2019 | Nakagami et al. | |
| 2016/0352190 A1 * | 12/2016 | Hieda | .................. H02K 11/215 |
| 2020/0212753 A1 | 7/2020 | Okuhata et al. | |

FOREIGN PATENT DOCUMENTS

| | | | |
|---|---|---|---|
| JP | 2002327815 A | 11/2002 |
| JP | 4951646 B2 | 6/2012 |
| JP | 2016220385 A | 12/2016 |
| WO | 2013069774 A1 | 5/2013 |
| WO | 2018030322 A1 | 2/2018 |

* cited by examiner

MOTOR UNIT

CROSS-REFERENCE TO RELATED APPLICATIONS

This is the U.S. national stage of application No. PCT/JP2020/000653, filed on Jan. 10, 2020, and priority under 35 U.S.C. § 119(a) and 35 U.S.C. § 365(b) is claimed from Japanese Patent Application No. 2019-040863 filed on Mar. 6, 2019, Japanese Patent Application No. 2019-075237 filed on Apr. 11, 2019, and Japanese Patent Application No. 2019-110648 filed on Jun. 13, 2019.

FIELD OF THE INVENTION

The present invention relates to a motor unit.

The present application claims priority based on Japanese Patent Application No. 2019-040863 filed in Japan on Mar. 6, 2019, Japanese Patent Application No. 2019-075237 filed in Japan on Apr. 11, 2019, and Japanese Patent Application No. 2019-110648 filed in Japan on Jun. 13, 2019, the contents of which are incorporated herein by reference.

BACKGROUND

Motor units including inverters have been conventionally disclosed as drive apparatuses of electric vehicles. For example, there is disclosed a drive apparatus including a motor and an inverter disposed immediately above the motor.

Unfortunately, a conventional drive apparatus includes a housing in which a portion housing the inverter is likely to have insufficient rigidity, so that vibration of the motor or a gear unit is transmitted to the inverter, and thus may affect operation of the inverter.

SUMMARY

An exemplary motor unit according to the present invention includes: a motor that rotates about a motor axis; a gear unit connected to the motor; an inverter that controls a current to be supplied to the motor; and a housing having a motor housing portion that houses the motor, an inverter housing portion that houses the inverter, and a gear housing portion that houses the gear unit. The inverter housing portion is supported by the motor housing portion and the gear housing portion.

The above and other elements, features, steps, characteristics and advantages of the present disclosure will become more apparent from the following detailed description of the preferred embodiments with reference to the attached drawings.

DETAILED DESCRIPTION

Figure 1:
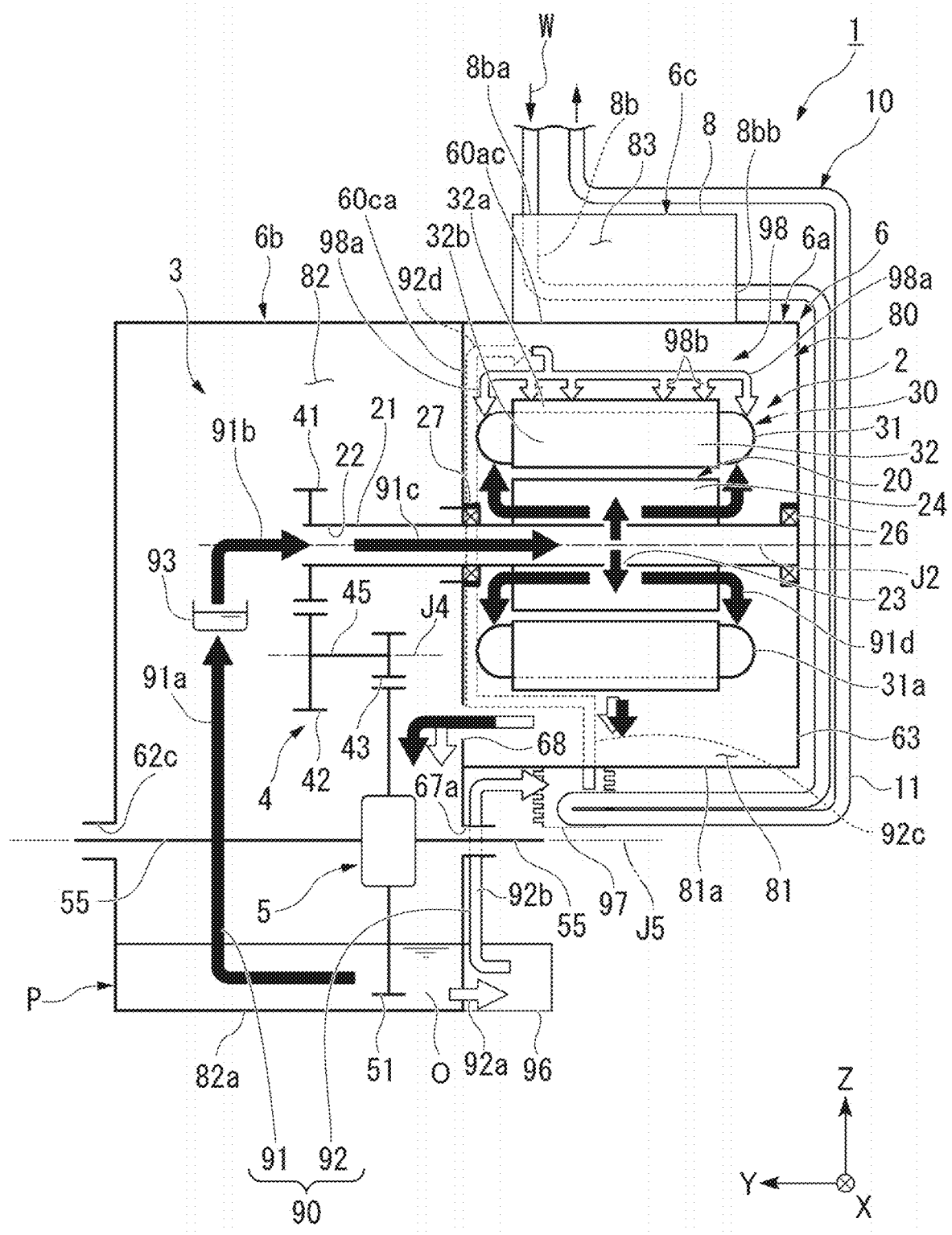
FIG. 1 is a conceptual diagram schematically illustrating a motor unit according to an embodiment.

Hereinafter, a motor unit according to an embodiment of the present invention will be described with reference to the accompanying drawings. The scope of the present invention is not limited to the embodiments described below, and can be arbitrarily changed within a range of technical ideas of the present invention.

The following description will be made with the direction of gravity being defined on the basis of positional relationships in the case where a motor unit 1 is mounted in a vehicle on a horizontal road surface. In the accompanying drawings, an XYZ coordinate system is shown appropriately as a three-dimensional orthogonal coordinate system. In the XYZ coordinate system, a Z-axis direction corresponds to a vertical direction (i.e., an up-down direction), and a +Z direction points upward (i.e., in a direction opposite to the direction of gravity), while a −Z direction points downward (i.e., in the direction of gravity). An X-axis direction is orthogonal to the Z-axis direction and indicates a front-rear direction of the vehicle in which the motor unit 1 is mounted. A +X direction points the front of the vehicle, and a −X direction points the rear of the vehicle. A Y-axis direction is orthogonal to both the X-axis direction and the Z-axis direction and indicates a width direction (left-right direction) of the vehicle. A +Y direction points the right of the vehicle, and a −Y direction points the left of the vehicle.

In the following description, unless otherwise specified, a direction (i.e., the Y-axis direction) parallel to a motor axis J2 of a motor 2 will be simply referred to by the term "axial direction", "axial", or "axially", radial directions centered on the motor axis J2 will be simply referred to by the term "radial direction", "radial", or "radially", and a circumferential direction centered on the motor axis J2, i.e., a circumferential direction about the motor axis J2, will be simply referred to by the term "circumferential direction", "circumferential", or "circumferentially".

In the embodiment described below, the motor axis J2 extends parallel to the vehicle. Thus, in the following description, the axial direction is parallel to the width direction of the vehicle. In the present specification, one axial side is a −Y side, and the other axial side is a +Y side.

In the present specification, "extending along" a predetermined direction (or plane) includes not only extending strictly in the predetermined direction but also extending in a direction inclined within a range of less than 45° with respect to the strict predetermined direction.

Hereinafter, the motor unit 1 according to an exemplary embodiment of the present invention will be described. The motor unit 1 of the present embodiment is mounted in a vehicle having a motor as a power source, such as a hybrid electric vehicle (HEV), a plug-in hybrid vehicle (PHV), or an electric vehicle (EV), and is used as the power source thereof. That is, the motor unit 1 is a drive apparatus.

Figure 2:
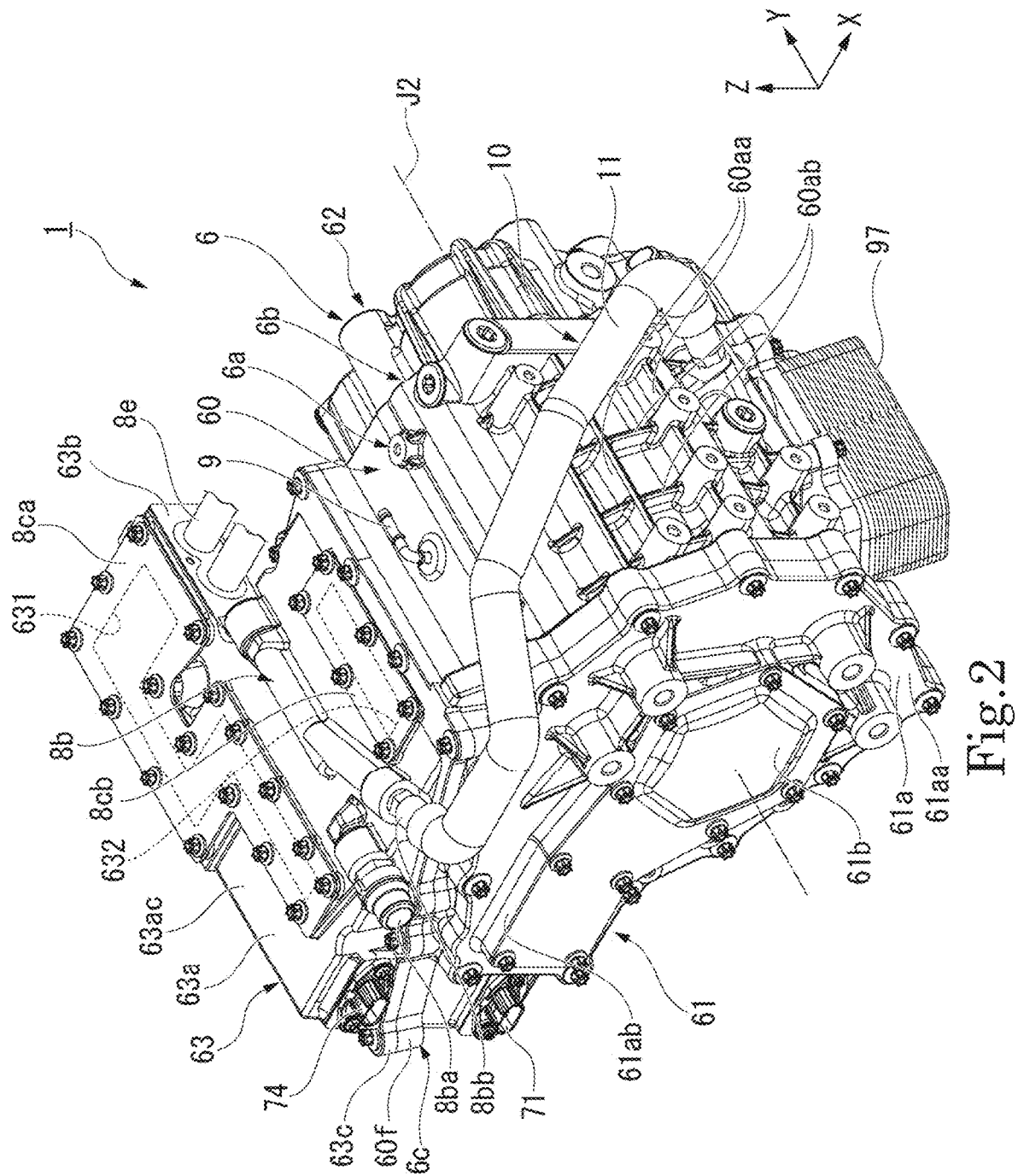
FIG. 2 is a perspective view of a motor unit according to an embodiment.

FIG. 1 is a conceptual diagram schematically illustrating the motor unit 1. FIG. 2 is a perspective view of the motor unit 1.

As illustrated in FIG. 1, the motor unit 1 includes a motor (main motor) 2 that rotates about the motor axis J2, a gear unit 3 connected to the motor 2, a housing 6, oil (first refrigerant) O circulating in an oil passage 90, cooling water (second refrigerant) W circulating in a water passage 10, and an inverter 8. The inverter 8 is disposed close to an outer peripheral surface of the motor 2. The gear unit 3 is disposed on any one side in the axial direction of the motor 2 (the other axial side in the present embodiment).

The housing 6 is provided inside with a housing space 80 for housing the motor 2, the gear unit 3, and the inverter 8. The housing 6 holds the motor 2, the gear unit 3, and the inverter 8 in the housing space 80. The housing space 80 is partitioned into a motor chamber 81 that houses the motor 2, a gear chamber 82 that houses the gear unit 3, and an inverter chamber 83 that houses a part of the inverter 8 and a connection line. In other words, the motor chamber 81 is a housing space inside a motor housing portion 6a, the gear chamber 82 is a housing space inside a gear housing portion 6b, and the inverter chamber 83 is a housing space inside an inverter housing portion 6c.

The housing space 80 is provided in its bottom region with an oil pool P in which an oil O accumulates. In the present embodiment, the motor chamber 81 has a bottom portion 81a located above a bottom portion 82a of the gear chamber 82. The motor chamber 81 and the gear chamber 82 are partitioned by a first partition wall 60ba that is provided with a partition wall opening 68. The partition wall opening 68 allows the motor chamber 81 to communicate with the gear chamber 82. The partition wall opening 68 allows the oil O accumulated in a bottom region of the motor chamber 81 to be transferred to the gear chamber 82. Thus, in the present embodiment, the oil pool P is located in a bottom region of the gear chamber 82.

The motor 2 is housed in the motor chamber 81 of the housing 6. The motor 2 includes a rotor 20 that rotates about the motor axis J2 extending in the horizontal direction, a stator 30 located radially outside the rotor 20, and a first bearing 26 and a second bearing 27 that rotatably support the rotor 20. The motor 2 of the present embodiment is an inner-rotor motor.

The rotor 20 rotates when an alternating current is supplied from a battery (not illustrated) to the stator 30 using the inverter 8. The rotor 20 includes a shaft 21, a rotor core 24, and a plurality of rotor magnets (not illustrated). The rotor 20 (i.e., the shaft 21, the rotor core 24, and the rotor magnet) rotates about the motor axis J2 extending in the horizontal direction and the width direction of the vehicle. Torque of the rotor 20 is transmitted to the gear unit 3.

The shaft 21 extends along the axial direction about the motor axis J2. The shaft 21 rotates about the motor axis J2. The shaft 21 is a hollow shaft having a hollow portion 22. The shaft 21 is provided with a communication hole 23 that extends in the radial direction to allow the hollow portion 22 to communicate with the outside of the shaft 21.

The shaft 21 extends across the motor chamber 81 and the gear chamber 82 of the housing 6. The shaft 21 has an end portion on the other axial side that protrudes from the motor chamber 81 toward the gear chamber 82. To the end portion of the shaft 21 protruding toward the gear chamber 82, a first gear 41 of the gear unit 3 is fixed.

The shaft 21 is rotatably supported by two bearings (the first bearing 26 and the second bearing 27). The first bearing 26 and the second bearing 27 are located in the motor chamber 81. The first bearing 26 and the second bearing 27 are located on opposite axial sides of the shaft 21 across the rotor core 24. The first bearing 26 and the second bearing 27 are held in the housing 6. More specifically, the first bearing 26 is held in a closing part 61, and second bearing 27 is held in a first partition wall 60ba.

The rotor core 24 is formed by stacking silicon steel plates. The rotor core 24 is a cylindrical column extending along the axial direction. The plurality of rotor magnets (not illustrated) is fixed to the rotor core 24. The plurality of rotor magnets is disposed side by side along the circumferential direction while a magnetic pole is alternately changed.

The stator 30 includes a stator core 32, a coil 31, and an insulator (not illustrated) interposed between the stator core 32 and the coil 31. The stator 30 is held in the housing 6. The stator core 32 includes a core back portion 32a in an annular shape and multiple teeth 32b extending radially inward from the core back portion 32a. A coil wire is wound around the teeth 32b. The coil wire wound around the teeth 32b constitutes the coil 31. That is, the coil 31 is wound around the stator core 32 with the insulator interposed therebetween. As described later, a coil wire 31b extending from the coil 31 is connected to the inverter 8 using a first busbar unit 70 (see FIG. 6) and a second busbar unit 77 (via FIG. 9).

The coil 31 has a pair of coil ends 31a. One coil end 31a protrudes in the axial direction from an end surface of the stator core 32 on the one axial side, and the other coil end 31a protrudes in the axial direction from an end surface of the stator core 32 on the other axial side.

The gear unit 3 is housed in the gear chamber 82 of the housing 6. The gear unit 3 is connected to the shaft 21 on the other axial side of the motor axis J2. The gear unit 3 includes a reduction gear 4 and a differential gear 5. Torque output from the motor 2 is transmitted to the differential gear 5 using the reduction gear 4.

The reduction gear 4 is connected to the rotor 20 of the motor 2. The reduction gear 4 has a function of increasing the torque output from the motor 2 in accordance with a reduction ratio by reducing rotation speed of the motor 2. The reduction gear 4 transmits the torque output from the motor 2 to the differential gear 5.

The reduction gear 4 includes the first gear 41, a second gear 42, a third gear 43, and an intermediate shaft 45. The torque output from the motor 2 is transmitted to a ring gear 51 of the differential gear 5 using the shaft 21 of the motor 2, the first gear 41, the second gear 42, the intermediate shaft 45, and the third gear 43. A gear ratio of each gear, the number of gears, and the like can be modified in various manners in accordance with a required reduction ratio. The reduction gear 4 is a speed reducer of a parallel-axis gear type in which center axes of respective gears are disposed parallel to each other.

The first gear 41 is provided on an outer peripheral surface of the shaft 21 of the motor 2. The first gear 41 rotates about the motor axis J2 together with the shaft 21. The intermediate shaft 45 extends along an intermediate axis J4 parallel to the motor axis J2. The intermediate shaft 45 rotates about the intermediate axis J4. The second gear 42 and the third gear 43 are provided on an outer peripheral surface of the intermediate shaft 45. The second gear 42 and the third gear 43 are connected to each other using the intermediate shaft 45. The second gear 42 and the third gear 43 rotate about the intermediate axis J4. The second gear 42 meshes with the first gear 41. The third gear 43 meshes with the ring gear 51 of the differential gear 5.

The differential gear 5 is connected to the motor 2 using the reduction gear 4. The differential gear 5 transmits torque output from the motor 2 to a wheel of a vehicle. The differential gear 5 has a function of transmitting the torque to output shafts 55 of left and right wheels while absorbing a speed difference between the left and right wheels when the vehicle turns. The differential gear 5 includes the ring gear 51, a gear housing (not illustrated), a pair of pinion gears (not illustrated), a pinion shaft (not illustrated), and a pair of side gears (not illustrated).

The ring gear 51 rotates about a differential axis J5 parallel to the motor axis J2. The torque output from the motor 2 is transmitted to the ring gear 51 using the reduction gear 4. That is, the ring gear 51 is connected to the motor 2 using another gear.

The inverter 8 is electrically connected to the motor 2. The inverter 8 controls a current to be supplied to the motor 2. The inverter 8 is fixed to an inverter housing 63 of the housing 6.

Figure 3:
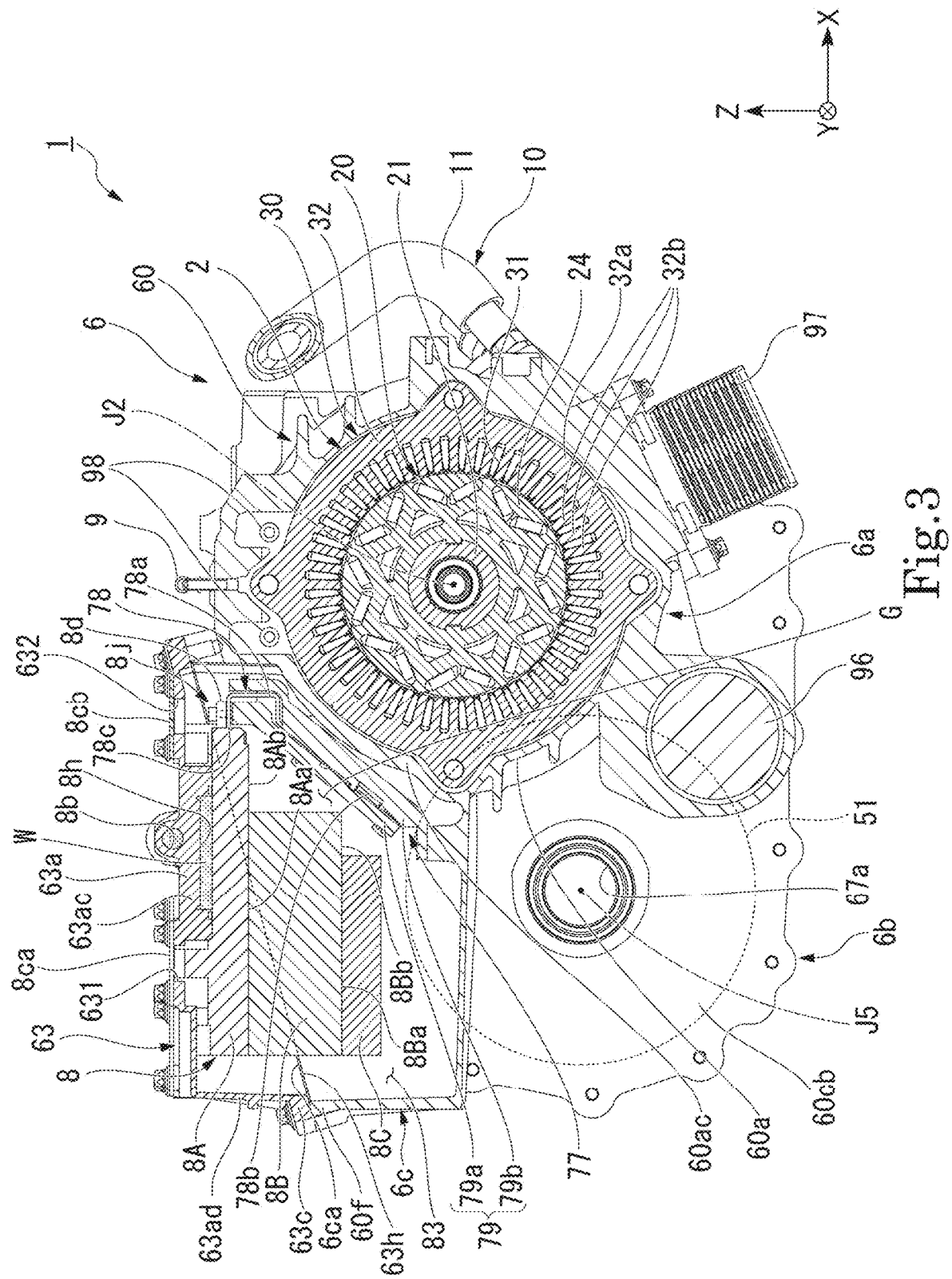
FIG. 3 is a sectional view of a motor unit according to an embodiment.

FIG. 3 is a sectional view of the motor unit 1 taken along a plane orthogonal to the motor axis J2.

As illustrated in FIG. 3, the inverter 8 includes a switching element (first member) 8A, a capacitor (second member) 8B, a power substrate 8C, and an inverter busbar 8d. The switching element 8A of the present embodiment is an insulated gate bipolar transistor (IGBT). The switching element 8A and the capacitor 8B are each connected to the power substrate 8C. The inverter 8 is connected to a battery (not illustrated) mounted on the vehicle to convert a direct current supplied from the battery into an alternating current and supply the alternating current to the motor 2.

The inverter busbar 8d extends from the switching element 8A. The inverter busbar 8d is connected to a second busbar 78 described later at a connection portion 8j.

Figure 4:
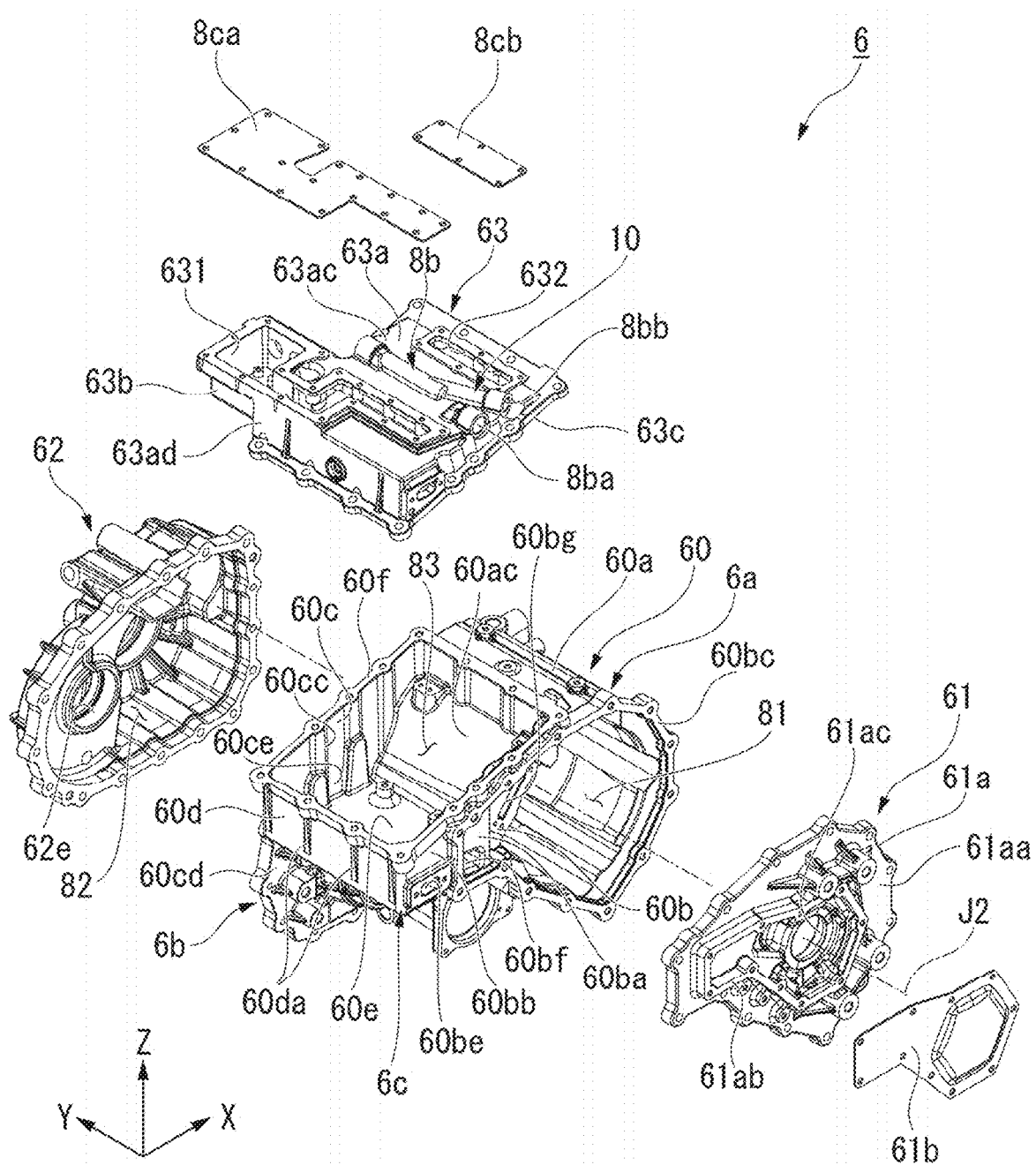
FIG. 4 is an exploded perspective view of a housing according to an embodiment.
Figure 5:
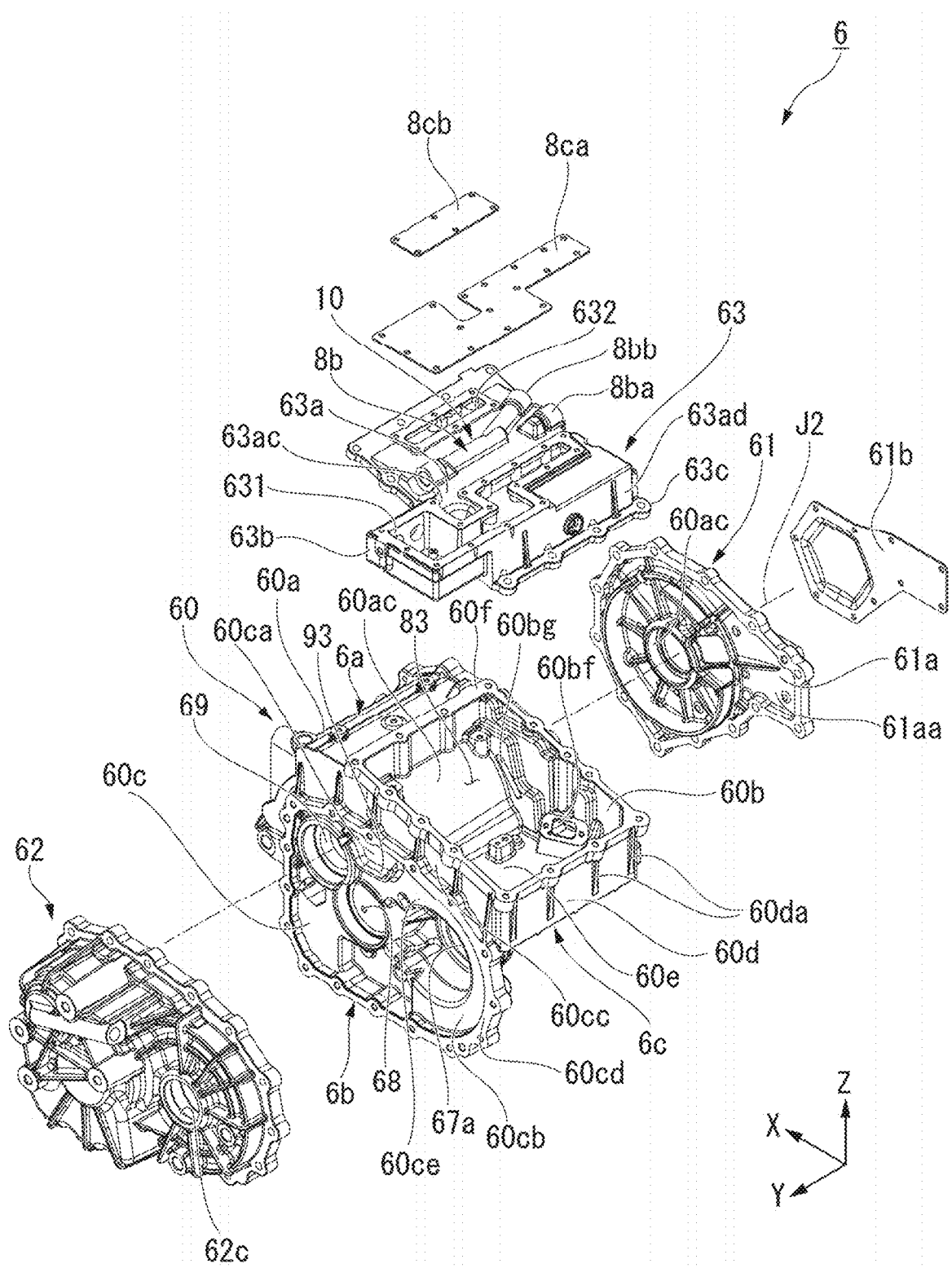
FIG. 5 is an exploded perspective view of a housing according to an embodiment.

FIGS. 4 and 5 are each an exploded perspective view of the housing 6 viewed from a different direction.

The housing 6 includes a housing body 60, the closing part 61, a gear housing 62, and the inverter housing 63.

The housing body 60 includes a motor housing portion 6a, a gear housing portion 6b, and an inverter housing portion 6c. That is, the housing 6 includes the motor housing portion 6a, the gear housing portion 6b, and the inverter housing portion 6c. The motor housing portion 6a opens on the one axial side. The gear housing portion 6b opens on the other axial side. The inverter housing portion 6c opens upward. The closing part 61, the gear housing 62, and the inverter housing 63 are fixed to the housing body 60.

The housing body 60 and the closing part 61 are disposed facing each other in the axial direction and are fixed to each other. The closing part 61 is configured to cover the opening of the motor housing portion 6a of the housing body 60. The housing body 60 and the closing part 61 surround a space that constitutes the motor chamber 81 in which the motor 2 is housed.

The housing body 60 and the gear housing 62 are disposed facing each other in the axial direction and are fixed to each other. The gear housing 62 is configured to cover the opening of the gear housing portion 6b of the housing body 60. The housing body 60 and the gear housing 62 surround a space that constitutes the gear chamber 82 in which the gear unit 3 is housed.

The housing body 60 and the inverter housing 63 are disposed facing each other in the vertical direction and are fixed to each other. The inverter housing 63 is configured to cover the opening of the inverter housing portion 6c of the housing body 60. The housing body 60 and the inverter housing 63 surround a space that constitutes the inverter chamber 83 in which the inverter 8 is housed.

The housing body 60 is a single member. The housing body 60 includes a peripheral wall portion 60a in a tubular shape extending in the axial direction, a first side plate portion 60b and a second side plate portion 60c that are each in a plate-like shape extending along a plane orthogonal to the axial direction, and a first connection plate portion 60d and a second connection plate portion 60e that are each in a plate-like shape extending along the axial direction.

The peripheral wall portion 60a has a cylindrical shape about the motor axis J2. The peripheral wall portion 60a surrounds the motor 2 from radially outward.

As illustrated in FIG. 2, the peripheral wall portion 60a is provided on its outer peripheral surface with a first rib 60aa extending along the motor axis J2 and a second rib 60ab extending along the circumferential direction about the motor axis J2. The first rib 60aa and the second rib 60ab can increase rigidity of the housing body 60 to reduce amplification of vibration and noise generated by rotation of the motor 2. The first rib 60aa may be used as a draining wall when the housing body 60 is molded by die-cast molding. The draining wall is a joint portion between molds for molding the housing body 60.

The outer peripheral surface of the peripheral wall portion 60a includes a region facing upward in which a breather device 9 for adjusting internal pressure of the motor chamber 81 is provided. The breather device 9 is preferably provided on an upper side of the housing 6. This enables the oil O in the motor chamber 81 to be prevented from entering the breather device 9 even when the vehicle travels on a slope. As a result, even when the vehicle travels on a slope, the breather device 9 can appropriately adjust the internal pressure of the motor chamber 81.

As illustrated in FIG. 4, the first side plate portion 60b is located at an end of the peripheral wall portion 60a on the one axial side (−Y side). The first side plate portion 60b is connected to the end of the peripheral wall portion 60a on the one axial side. The first side plate portion 60b extends from an edge portion of the peripheral wall portion 60a on the one axial side (−Y side) toward the rear of the vehicle. The first side plate portion 60b is located on the one axial side with respect to the inverter 8. The first side plate portion 60b is configured to cover the inverter 8 on the one axial side.

Figure 6:
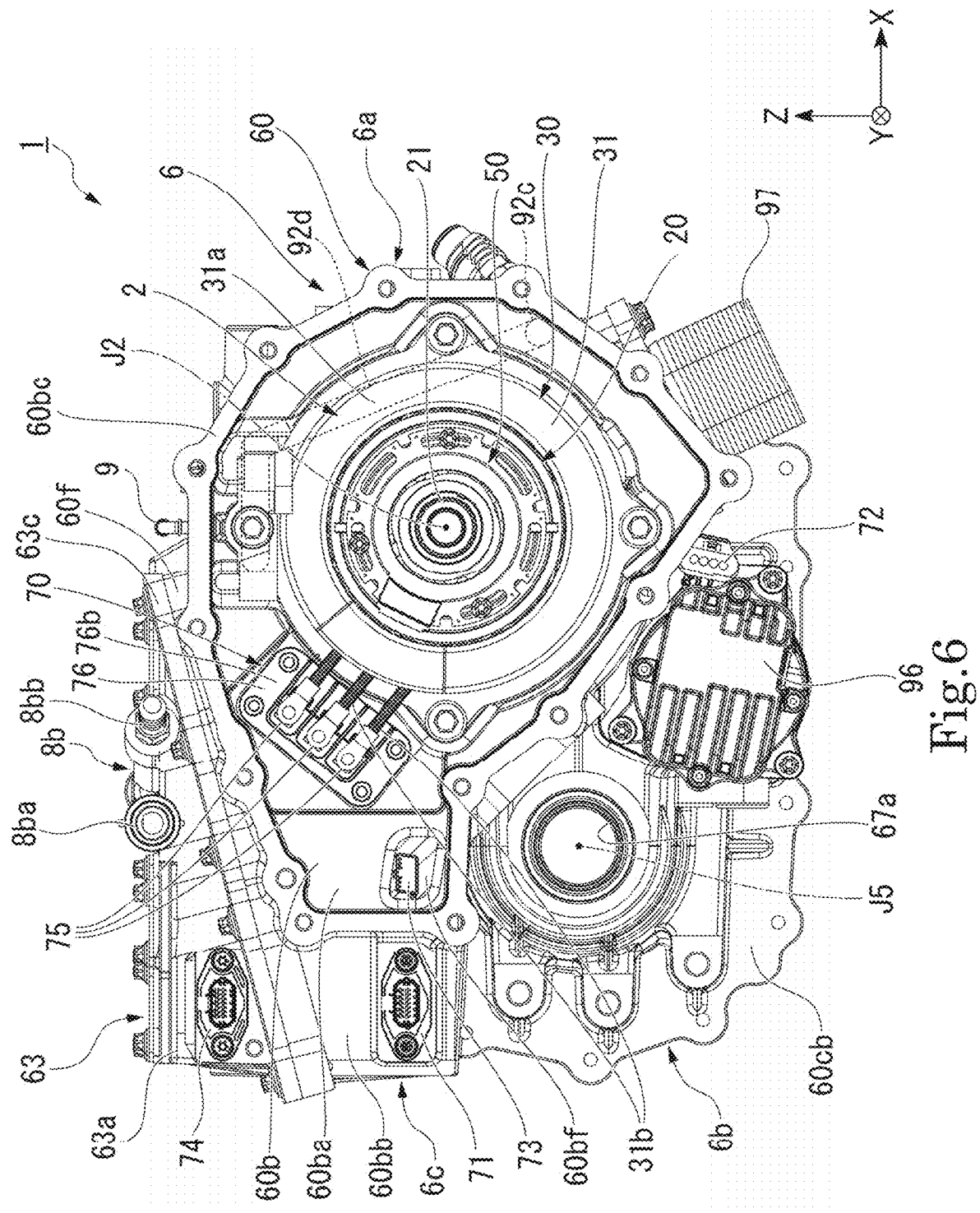
FIG. 6 is a side view of a motor unit according to an embodiment as viewed from one axial side.

FIG. 6 is a side view of the motor unit 1 as viewed from the one axial side. In FIG. 6, an illustration of the closing part 61 is eliminated.

The closing part 61 is fastened to the first side plate portion 60b. The first side plate portion 60b includes the first partition wall 60ba covered with the closing part 61, and a first protruding portion 60bb located closer to the rear of the vehicle than the first partition wall 60ba and exposed from the closing part 61. The first partition wall 60ba partitions the housing space 80 into the motor chamber 81 and the inverter chamber 83.

As illustrated in FIG. 4, the first protruding portion 60bb is provided with a first through-hole 60be that allows the inside and the outside of the inverter chamber 83 to communicate with each other. That is, the first side plate portion 60b is provided with the first through-hole 60be that passes through the first side plate portion 60b in the axial direction. A control line for supplying power supply voltage and a control signal from the inverter 8 to a pump 96 passes through the first through-hole 60be.

As illustrated in FIG. 6, a first connector 71 is attached to the first through-hole 60be. The first connector 71 is inserted into the first through-hole 60be from the one axial side. That is, the first connector 71 is attached to the first through-hole 60*be* from the outside of the inverter chamber 83. A control line of the pump 96 is connected to the inverter 8 using the first connector 71.

As illustrated in FIG. 4, the first partition wall 60*ba* is provided with a second through-hole 60*bf* and a third through-hole 60*bg* that allow the motor chamber 81 and the inverter chamber 83 to communicate with each other. That is, the first side plate portion 60*b* is provided with the second through-hole 60*bf* and the third through-hole 60*bg* that pass through the first side plate portion 60*b* in the axial direction.

A signal line of a rotation angle sensor 50 that detects a rotation angle of the motor 2 passes through the second through-hole 60*bf*. As illustrated in FIG. 6, a sensor connector 73 is attached to the second through-hole 60*bf*. The sensor connector 73 is inserted into the second through-hole 60*bf* from the one axial side. That is, the sensor connector 73 is attached to the second through-hole 60*bf* from inside the motor chamber 81.

As illustrated in FIG. 4, a power supply line that connects the inverter 8 to the stator 30 to supply power supply voltage to the stator passes through the third through-hole 60*bg*. As illustrated in FIG. 6, the first busbar unit 70 is inserted into the third through-hole 60*bg*. The first busbar unit 70 will be described in detail later. The first partition wall 60*ba* is provided around the third through-hole with a screw hole for fixing the first busbar unit 70 to the first partition wall 60*ba*. The first busbar unit 70 is inserted into the third through-hole 60*bg* from the one axial side.

The first side plate portion 60*b* is provided with a motor-side flange section 60*bc* for fixing the closing part 61. The motor-side flange section 60*bc* is provided with a plurality of screw holes for fixing the closing part 61 to the housing body 60. The motor-side flange section 60*bc* protrudes in the axial direction from a surface of each of the first partition wall 60*ba* and first protruding portion 60*bb*, the surface facing the one axial side.

According to the present embodiment, the first busbar unit 70, the sensor connector 73, and the first connector 71 are attached to the housing body 60 by being inserted into the first side plate portion 60*b* from the one axial side toward the other axial side. Thus, according to the present embodiment, the first busbar unit 70, the sensor connector 73, and the first connector 71 can be assembled to the housing body 60 from one direction, so that an assembly process can be simplified. Additionally, an assembling direction of the first busbar unit 70, the sensor connector 73, and the first connector 71 coincides with an assembling direction of the closing part 61, so that the assembly process of the motor unit 1 can be further simplified.

In the present embodiment, the motor-side flange section 60*bc* protruding to the one axial side is provided between the sensor connector 73 and the first connector 71. That is, a wall (motor-side flange section 60*bc*) is disposed between the sensor connector 73 and the first connector 71. This allows the sensor connector 73 and the first connector 71 to be less likely to be affected by each other's noise.

As illustrated in FIG. 5, the second side plate portion 60*c* faces the first side plate portion 60*b* in the axial direction. The second side plate portion 60*c* is located at an end of the peripheral wall portion 60*a* on the other axial side (+Y side). The second side plate portion 60*c* is located on the other axial side with respect to the inverter 8. The second side plate portion 60*c* is configured to cover the inverter 8 on the other axial side.

The second side plate portion 60*c* includes a second partition wall 60*ca* for covering an opening of the peripheral wall portion 60*a* on the other axial side, an overhanging portion 60*cb* extending from the second partition wall 60*ca* toward the rear of the vehicle, and a second protruding portion 60*cc* extending upward from the overhanging portion 60*cb*. The second partition wall 60*ca* and the overhanging portion 60*cb* are covered with the gear housing 62. In contrast, the second protruding portion 60*cc* is exposed from the gear housing 62.

The overhanging portion 60*cb* is provided with a first second shaft passing hole 67*a* through which an output shaft 55 supporting a wheel passes. The overhanging portion 60*cb* rotatably supports the output shaft 55 using a bearing held on an inner peripheral surface of the second shaft passing hole 67*a*. The overhanging portion 60*cb* includes a fourth partition wall 60*ce* that partitions the gear chamber 82 and the inverter chamber 83. The fourth partition wall 60*ce* and the second protruding portion 60*cc* are continuous in the vertical direction and constitute a wall surface of the inverter housing portion 6*c* on the other axial side (+Y side).

The second partition wall 60*ca* partitions the housing space 80 into the motor chamber 81 and the gear chamber 82. The motor housing portion 6*a* includes the peripheral wall portion 60*a* and the second partition wall 60*ca*. The second partition wall 60*ca* is provided with the partition wall opening 68 that guides oil in the motor chamber 81 into the gear chamber 82 and an insertion hole 69 allowing the shaft 21 of the motor 2 to be inserted therethrough.

The second side plate portion 60*c* is provided with a gear-side flange section 60*cd* for fixing the gear housing 62. The gear-side flange section 60*cd* surrounds the gear unit 3 from radially outward. The gear housing portion 6*b* includes the second side plate portion 60*c* and the gear-side flange section 60*cd*. The gear-side flange section 60*cd* is provided with a plurality of screw holes for fixing the gear housing 62 to the housing body 60. The gear-side flange section 60*cd* surrounds a periphery of each of the second partition wall 60*ca* and the overhanging portion 60*cb*. The gear-side flange section 60*cd* protrudes in the axial direction from a surface of each of the overhanging portion 60*cb* and the second protruding portion 60*cc*, the surface facing the other axial side.

The first connection plate portion 60*d* and the second connection plate portion 60*e* connect the first side plate portion 60*b* and the second side plate portion 60*c*. The first connection plate portion 60*d* and the second connection plate portion 60*e* are orthogonal to each other. The first connection plate portion 60*d* and the second connection plate portion 60*e* are connected to each other.

The first connection plate portion 60*d* connects end edges of the first side plate portion 60*b* and the second side plate portion 60*c* on a vehicle's rear side. The first connection plate portion 60*d* is located on the vehicle's rear side with respect to the peripheral wall portion 60*a*. The first connection plate portion 60*d* has a plate thickness direction that coincides with a vehicle longitudinal direction. The first connection plate portion 60*d* is located on the vehicle's rear side with respect to the inverter 8. The first connection plate portion 60*d* is configured to cover the inverter 8 on the vehicle's rear side.

The first connection plate portion 60*d* is provided with a plurality of ribs 60*da* extending along the vertical direction. The ribs 60*da* extend downward from an inverter-side flange section 60*f* located at an upper end of the first connection plate portion 60*d*. Providing the ribs 60*da* on the first connection plate portion 60*d* enables increasing rigidity of the housing body 60 to reduce amplification of vibration and noise generated by rotation of the motor 2.

The second connection plate portion 60e connects lower end edges of the first side plate portion 60b and the second side plate portion 60c. The second connection plate portion 60e is located on the vehicle's rear side with respect to the peripheral wall portion 60a. The second connection plate portion 60e has a plate thickness direction that coincides with the vertical direction. The second connection plate portion 60e is connected to the peripheral wall portion 60a. The second connection plate portion 60e extends from the peripheral wall portion 60a toward the rear of the vehicle.

The second connection plate portion 60e is connected at its end on the vehicle's rear side to the first connection plate portion 60d. That is, the first connection plate portion 60d extends upward from the end of the second connection plate portion 60e on the vehicle's rear side. The second connection plate portion 60e is located below the inverter 8. The second connection plate portion 60e is configured to cover the inverter 8 from below.

Although not illustrated, a plurality of ribs disposed side by side along the axial direction is provided on a lower surface of the second connection plate portion 60e. The plurality of ribs extends from the peripheral wall portion 60a toward the rear of the vehicle. Providing the ribs on the second connection plate portion 60e enables increasing rigidity of the housing body 60 to reduce amplification of vibration and noise generated by rotation of the motor 2.

The peripheral wall portion 60a has a third partition wall (wall portion) 60ac surrounded by the first side plate portion 60b, the second side plate portion 60c, and the second connection plate portion 60e. That is, the housing body 60 includes the third partition wall 60ac. The third partition wall 60ac partitions the housing space 80 into the motor chamber 81 and the inverter chamber 83.

The first side plate portion 60b, the second side plate portion 60c, the third partition wall 60ac, the first connection plate portion 60d, and the second connection plate portion 60e surround a periphery of the inverter 8. That is, the inverter housing portion 6c includes the third partition wall 60ac, the first side plate portion 60b, the second side plate portion 60c, the first connection plate portion 60d, and the second connection plate portion 60e. The third partition wall 60ac, the first connection plate portion 60d, the first side plate portion 60b, and the second side plate portion 60c are provided at their upper ends with the inverter-side flange section 60f for fixing the inverter housing 63.

As illustrated in FIG. 4, the inverter-side flange section 60f is provided with a plurality of screw holes for fixing the gear housing 62 to the housing body 60. The inverter-side flange section 60f inclines downward toward the rear as viewed from a vehicle width direction. That is, the inverter-side flange section 60f inclines with respect to the second connection plate portion 60e.

According to the present embodiment, the housing body 60 includes the third partition wall (first wall portion) 60ac that partitions the inverter chamber 83 and the motor chamber 81, and the fourth partition wall (second wall portion) 60ce that partitions the inverter chamber 83 and the gear chamber 82. The third partition wall 60ac also serves as a side wall of each of the inverter housing portion 6c and the motor housing portion 6a. Similarly, the fourth partition wall 60ce also serves as a side wall of each of the inverter housing portion 6c and the gear housing portion 6b. That is, according to the present embodiment, the inverter housing portion 6c is provided integrally with the motor housing portion 6a and the gear housing portion 6b, so that the inverter housing portion 6c is supported by the motor housing portion 6a and the gear housing portion 6b. Thus, as compared with the case where the inverter housing portion 6c is supported by only one of the motor housing portion 6a and the gear housing portion 6b, the inverter housing portion 6c can be increased in rigidity to enable reducing amplification of vibration and noise generated by rotation of the motor 2.

In the present embodiment, the motor housing portion 6a, the inverter housing portion 6c, and the gear housing portion 6b are formed of a single member (housing body 60), so that mutual support is further strengthened to enhance an effect of reducing vibration of the inverter housing portion 6c. However, even when the motor housing portion 6a, the inverter housing portion 6c, and the gear housing portion 6b are each a separate member, the inverter housing portion 6c supported by the motor housing portion 6a and the gear housing portion 6b enables the effect of reducing vibration of the inverter housing portion 6c to be obtained.

In the present embodiment, the inverter housing portion 6c includes the first side plate portion (third wall portion) 60b as a wall portion on the one axial side. The closing part 61 is fastened to the first side plate portion 60b. The inverter housing portion 6c is reinforced and increased in rigidity when the closing part 61 is fastened. That is, according to the present embodiment, the effect of reducing vibration of the inverter housing portion 6c can be further enhanced.

As illustrated in FIG. 4, the closing part 61 is fixed to the motor-side flange section 60bc of the housing body 60. The closing part 61 closes the opening of the motor housing portion 6a on the one axial side. That is, the closing part 61 is configured to cover the motor 2 from the one axial side. A seal member (not illustrated) is sandwiched between the closing part 61 and the motor-side flange section 60bc. The seal member prevents the oil in the motor chamber 81 from leaking out from between the closing part 61 and the housing body 60.

The closing part 61 is configured to cover the sensor connector 73 fixed to the first partition wall 60ba of the housing body 60 illustrated in FIG. 6 and the first busbar unit 70. The closing part 61 may have a function as a magnetic shield. At this time, noise generated in wiring of the rotation angle sensor 50 and in the first busbar unit 70 can be prevented from affecting the first connector 71 and the like.

As illustrated in FIG. 4, the closing part 61 includes a closing part body 61a and a cover 61b. The closing part 61 includes a seal member (not illustrated) that seals between the closing part body 61a and the cover 61b.

The closing part body 61a includes a closing flat portion 61aa and a cover flange section 61ab. The cover flange section 61ab protrudes from the closing flat portion 61aa to the one axial side. The closing flat portion 61aa is provided with a shaft insertion hole 61ac passing through the closing flat portion 61aa in the axial direction. The shaft insertion hole 61ac is disposed inside the cover flange section 61ab as viewed from the axial direction. Inside the shaft insertion hole 61ac, an end of the shaft 21 of the motor 2 on the one axial side is disposed.

The cover 61b is fixed to the cover flange section 61ab provided on the closing part body 61a. The cover 61b is configured to cover the shaft insertion hole 61ac from the one axial side. A seal member (not illustrated) is sandwiched between the cover 61b and the cover flange section 61ab. The seal member prevents the oil in the motor chamber 81 from leaking out from between the cover 61b and the closing part body 61a.

Figure 7:
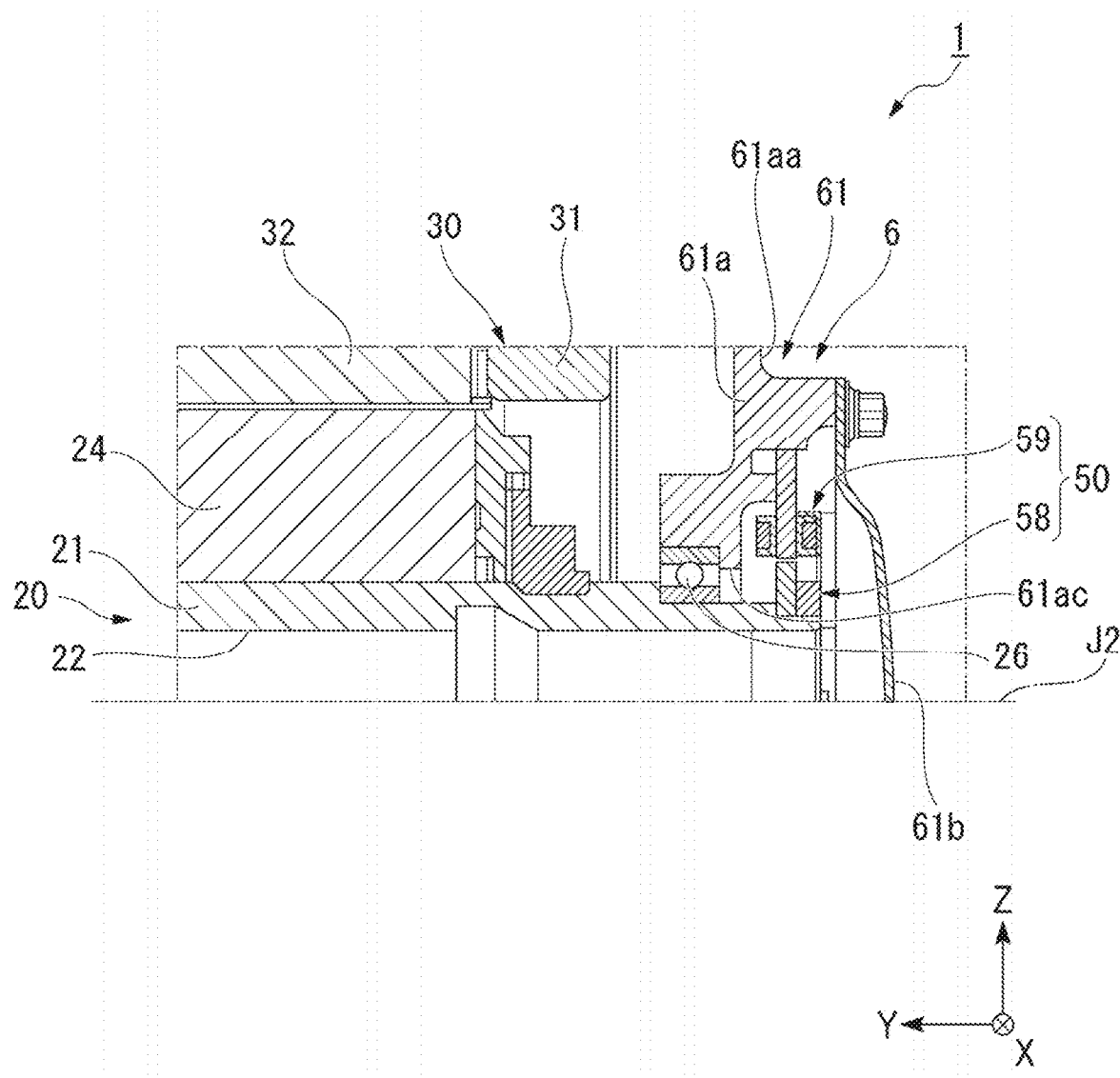
FIG. 7 is a partial sectional view of a motor unit according to an embodiment.

FIG. 7 is a partial sectional view of the motor unit including the closing part 61.

As illustrated in FIG. 7, a sensor housing portion 61*h* in which the rotation angle sensor 50 is housed is provided between the closing part body 61*a* and the cover 61*b*.

The end of the shaft 21 on the one axial side is disposed inside the sensor housing portion 61*h* while passing through the shaft insertion hole 61*ac*. The rotation angle sensor 50 includes a rotor 58 that is attached to the end of the shaft 21 on the one axial side. The rotor 58 rotates about the motor axis J2 together with the shaft 21.

Inside the sensor housing portion 61*h*, a stator 59 of the rotation angle sensor 50 is fixed to the closing part body 61*a* while surrounding the rotor 58. The stator 59 outputs a rotation angle relative to the rotor 58. That is, the rotation angle sensor 50 detects a rotation angle of the motor 2. In the present embodiment, the rotation angle sensor 50 is a resolver. The rotation angle sensor 50 is attached while the cover 61*b* is removed and the end of the shaft 21 on the one axial side is opened.

The stator of the rotation angle sensor may have a mounting portion with low rigidity in a conventional structure, so that vibration of a gear portion may affect detection accuracy of the rotation angle sensor. The motor unit 1 of the present embodiment is made to solve such a problem. According to the present embodiment, the housing 6 includes the closing part 61 configured to cover the opening of the motor housing portion 6*a* on the one axial side, and the closing part 61 includes the sensor housing portion 61*h* that houses the rotation angle sensor 50 therein. The rotation angle sensor 50 is enclosed and fixed inside the closing part 61 that is a structure having high rigidity. This enables suppressing transmission of vibration to the rotation angle sensor 50, so that detection accuracy using the rotation angle sensor 50 can be enhanced.

Figure 8:
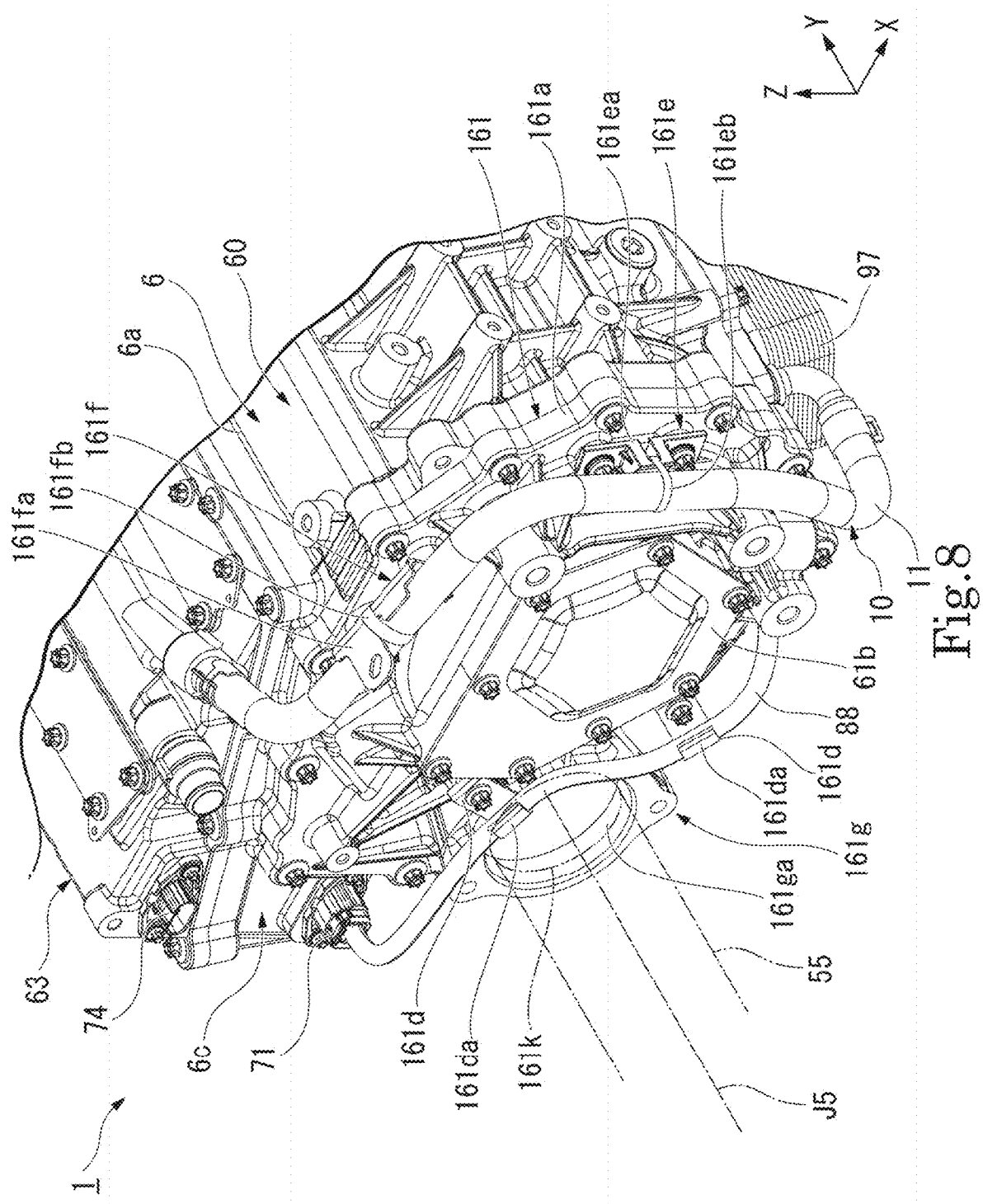
FIG. 8 is a perspective view of a motor unit having a closing part according to a modification.

FIG. 8 is a perspective view of the motor unit 1, illustrating a closing part 161 of a modification that can be used in the motor unit 1 of the present embodiment. The closing part 161 of the present modification has a configuration similar to that of the embodiment described above to achieve an effect similar to that of the embodiment described above. The closing part 161 of the present modification further has a function of supporting the output shaft 55 and a function of supporting a pipe and a cable.

As in the embodiment described above, the closing part 161 of the modification is fixed to the housing body 60. The closing part 161 closes the opening of the motor housing portion 6*a* on the one axial side. The closing part 161 of the present modification includes not only a closing part body 161*a* and the cover 61*b*, but also a first pipe support part (support part) 161*e*, a second pipe support part (support part) 161*f*, and a pair of cable support parts (support parts) 161*d*.

The first pipe support part 161*e* is located laterally to the cover 61*b* in the closing part 161. In contrast, the second pipe support part 161*f* is located above the cover 61*b* in the closing part 161. A cooling water pipe 11 is routed from the inverter housing 63 toward a cooler 97 along from an upper portion of the closing part 161 and to a side portion thereof. The first and second pipe support parts 161*e* and 161*f* support the cooling water pipe 11 in the upper and side portions of the closing part 161.

The first pipe support part 161*e* includes a first pedestal portion 161*ea* and a binding band 161*eb*. The first pedestal portion 161*ea* is, for example, a resin member. The first pedestal portion 161*ea* is fixed to a surface of the closing part body 161*a* with a bolt, the surface facing the axial direction. The first pedestal portion 161*ea* has a seat surface in contact with the cooling water pipe 11, the seat surface facing the one axial side. The seat surface is curved in accordance with a pipe diameter of the cooling water pipe 11. This allows the cooling water pipe 11 to be less likely to be displaced with respect to the first pedestal portion 161*ea*. The first pedestal portion 161*ea* is provided with an insertion portion allowing the binding band 161*eb* to pass therethrough. The insertion portion is located behind the seat surface as viewed from the one axial side. The binding band 161*eb* is caused to pass through the insertion portion of the first pedestal portion 161*ea* and to be wound around the cooling water pipe 11. The binding band 161*eb* presses the cooling water pipe 11 against the seat surface of the first pedestal portion 161*ea*. According to the present modification, the cooling water pipe 11 can be fixed to the closing part 161 with a simple structure.

As with the first pipe support part 161*e*, the second pipe support part 161*f* includes a second pedestal portion 161*fa* and a binding band 161*fb*. The second pedestal portion 161*fa* is a plate-shaped member made of, for example, a metal material. The second pedestal portion 161*fa* is fixed to a surface of the closing part body 161*a* with a bolt, the surface facing the one axial side. The second pedestal portion 161*fa* is provided with a through-hole allowing the binding band 161*fb* to pass therethrough. The binding band 161*fb* is caused to pass through the through-hole of the second pedestal portion 161*fa* and to be wound around the cooling water pipe 11. According to the present modification, the cooling water pipe 11 can be fixed to the closing part 161 with a simple structure.

Each cable support part 161*d* supports a cable 88 connecting the inverter 8 and the pump 96. Each cable support part 161*d* is located below the cover 61*b* in the closing part 161. Each cable support part 161*d* is a plate-shaped member made of, for example, a metal material. Each cable support part 161*d* is fixed to a surface of the closing part body 161*a* with a bolt, the surface facing the one axial side. Each cable support part 161*d* includes a clip portion 161*da* that is curled with a diameter slightly smaller than an outer diameter of the cable 88 to be supported. When the cable 88 is inserted into the clip portion 161*da*, the clip portion 161*da* holds the cable 88 by its elastic deformation. According to the present modification, the cable 88 can be fixed to the closing part 161 with a simple structure and a simple procedure.

In the conventional structure, a cable and a pipe provided in a motor unit may be unstably supported. The configuration of the present modification is made to solve such a problem. According to the present modification, the closing part 161 includes the support parts (first and second pipe support parts 161*e* and 161*f*, and the cable support part 161*d*) that hold the cable 88 or the cooling water pipe 11. As a result, even when the motor unit 1 generates vibration, a load to be applied to connection portions of the cooling water pipe 11 and the cable 88 can be reduced, and thus reliability of these connections can be enhanced. In the assembly process, the cooling water pipe 11 and the cable 88 may be fixed to the closing part 161 in advance using the first and second pipe support parts 161*e* and 161*f*, and the cable support part 161*d*. This enables the assembly process to be simplified.

The closing part body 161*a* of the present modification includes a shaft holding portion 161*g* that extends downward and holds the output shaft 55. That is, the closing part 161 includes the shaft holding portion 161*g*. The shaft holding portion 161*g* has a plate-like shape along a plane orthogonal to the axial direction.

The shaft holding portion 161*g* is provided with a shaft passing hole 161*ga* passing through the shaft holding portion 161*g* in the axial direction. The shaft passing hole 161*ga* is circular as viewed from the axial direction. The shaft passing hole 161ga has an inner peripheral surface on which a bearing 161k is held. That is, an outer ring of the bearing 161k is fitted into the inner peripheral surface of the shaft passing hole 161ga. The shaft holding portion 161g rotatably supports the output shaft 55 using the bearing 161k.

In general, a pair of output shafts extending from a differential gear includes one output shaft that may be longer than the other output shaft. In such a case, the conventional structure has a problem that the longer output shaft is likely to be unstably supported. The configuration of the present modification is made to solve such a problem. According to the present modification, the closing part 161 includes the shaft holding portion 161g that holds one of the pair of output shafts 55 of the gear unit 3, passing through below the inverter housing portion 6c. This enables stabilizing support of the output shaft 55 that is long due to a long distance to the wheel. According to the present modification, the shaft holding portion 161g is provided integrally with the closing part 161, so that an increase in the number of components can be suppressed, and thus assembly performance is not deteriorated.

The gear housing 62 is fixed to the gear-side flange section 60cd. The gear housing 62 has a recessed shape that opens to the one axial side. The gear housing 62 has an opening covered with the second side plate portion 60c. The gear housing 62 and the second side plate portion 60c surround a space constituting the gear chamber 82 that houses the gear unit 3.

Between the gear housing 62 and the gear-side flange section 60cd, a seal member (not illustrated) is sandwiched. The seal member prevents oil in the gear chamber 82 from leaking out from between the gear housing 62 and the housing body 60.

The gear housing 62 is provided with a first shaft passing hole 62c passing through the gear housing 62 in the axial direction. The first shaft passing hole 62c overlaps the second shaft passing hole 67a as viewed from the axial direction. The output shaft 55 supporting the wheel passes through the first shaft passing hole 62c. The gear housing 62 rotatably supports the output shaft 55 using a bearing held on an inner peripheral surface of the first shaft passing hole 62c.

The inverter housing 63 is fixed to the inverter-side flange section 60f. The inverter housing 63 has a recessed shape that opens downward. The inverter housing 63 has an opening covered with the housing body 60. More specifically, the opening of the inverter housing 63 is covered with the peripheral wall portion 60a and the second connection plate portion 60e.

The inverter housing 63 and the housing body 60 surround a space constituting the inverter chamber 83 that houses the inverter 8. The inverter housing 63 houses the inverter 8 and a part of wiring extending from the inverter 8.

The inverter housing 63 includes a body housing portion 63a that holds (houses) the inverter 8 and a power supply line housing portion 63b that holds (houses) a power supply connector 8e. The body housing portion 63a and the power supply line housing portion 63b are disposed side by side along the axial direction. The power supply line housing portion 63b is located on the other axial side (+Y side) with respect to the body housing portion 63a.

As illustrated in FIG. 2, the power supply line housing portion 63b is located outside the inverter housing portion 6c as viewed from the vertical direction. That is, the power supply line housing portion 63b protrudes from a side surface of the inverter housing portion 6c. The power supply line housing portion 63b protrudes from a side surface of the body housing portion 63a. The power supply connector 8e electrically connects a battery (not illustrated) mounted on the vehicle and the inverter 8, and supplies electric power from the battery to the inverter 8. The power supply connector 8e protrudes from a side surface of the inverter 8 in the width direction. The power supply connector 8e includes a connector terminal. The connector terminal protrudes from the power supply connector 8e toward the front of the vehicle.

Figure 9:
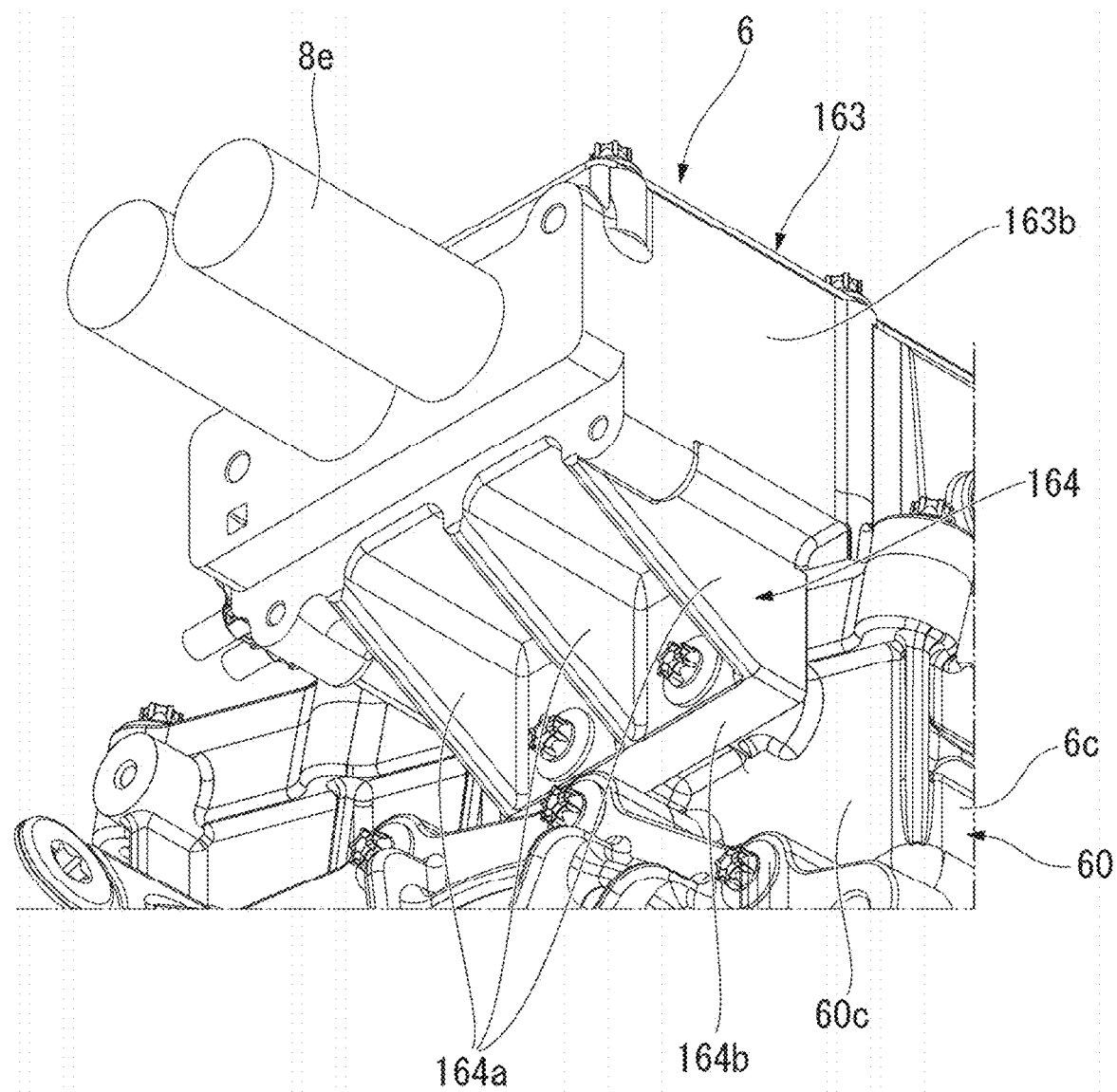
FIG. 9 is an enlarged perspective view of an inverter housing according to a modification.

FIG. 9 is an enlarged perspective view of a power supply line housing portion 163b of an inverter housing 163 according to a modification that can be used in the present embodiment.

As illustrated in FIG. 9, the inverter housing 163 of the modification further includes a reinforcing portion 164 that reinforces the power supply line housing portion 163b. That is, the housing 6 may include the power supply line housing portion 163b and the reinforcing portion 164 that reinforces the power supply line housing portion 163b. The reinforcing portion 164 includes a fastening plate 164b extending along the second side plate portion 60c of the housing body 60 and a plurality of ribs 164a. The reinforcing portion 164 is fastened to the inverter housing portion 6c on the fastening plate 164b. The plurality of ribs 164a extends along the vertical direction. The plurality of ribs 164a connects a lower surface of the power supply line housing portion 163b and the second side plate portion 60c. The reinforcing portion 164 reinforces the power supply line housing portion 163b to increase rigidity of the power supply line housing portion 163b. This suppresses vibration of the power supply line housing portion 163b, so that a load to be applied to the power supply connector 8e when vibration is generated can be reduced.

In the present modification, the reinforcing portion 164 is provided integrally with the inverter housing 163 and fixed to the housing body 60. However, the reinforcing portion 164 may be provided integrally with the housing body 60 and fixed to the inverter housing.

As illustrated in FIG. 3, the body housing portion 63a has a recessed shape that opens downward. The body housing portion 63a is provided at an edge of its opening with a mounting flange section 63c. The mounting flange section 63c faces the inverter-side flange section 60f in the axial direction. The inverter housing 63 is fixed to the inverter-side flange section 60f with the mounting flange section 63c.

As illustrated in FIG. 6, a signal connector 74 is provided on a side surface of the body housing portion 63a on the one axial side. The signal connector 74 is a connector of a signal line connected to the outside. In the present embodiment, the first connector 71 and the signal connector 74 face the same direction. This enables attaching the wiring outside the motor unit 1, being connected to the pump 96, and the signal line connected to the outside, in the same direction, so that assembly of the motor unit 1 can be simplified. This also enables eliminating complexity of the wiring in appearance of the motor unit 1.

As illustrated in FIG. 3, the body housing portion 63a includes a top plate portion 63ac in a plate-like shape extending along the horizontal direction, and a side wall portion 63ad protruding from an edge portion of the top plate portion 63ac along a thickness direction of the top plate portion 63ac. That is, the inverter housing 63 includes the top plate portion 63ac and the side wall portion 63ad. The side wall portion 63ad extends in a rectangular shape along the edge portion of the top plate portion 63ac as viewed from the thickness direction of the top plate portion 63ac. The power supply connector 8e is disposed on the side wall portion 63ad. The top plate portion 63ac is configured to cover the opening of the inverter housing portion 6c from above. The inverter 8 is fixed to a back surface (i.e., a surface facing the inside of the inverter housing portion 6c) of the top plate portion 63ac. This allows the inverter housing 63 to support the inverter 8.

According to the present embodiment, the inverter 8 is fixed to the inverter housing 63 that is detachable from the housing body 60. Thus, when maintenance of the motor unit 1 such as periodic inspection and component replacement is performed, the inverter 8 can be easily detached from the motor unit 1 by releasing the fastening between the inverter housing 63 and the housing body 60. This process can be performed even when the motor unit 1 is mounted on the vehicle, so that maintenance efficiency of the inverter 8 can be improved.

The inverter housing 63 forms a recessed shape that opens downward, using the top plate portion 63ac and the side wall portion 63ad. That is, the inverter housing 63 includes an inverter housing opening 63h. The inverter housing opening 63h is along an opening 6ca of the inverter housing portion 6c. At least a part of the inverter 8 is disposed protruding downward from the inverter housing opening 63h. That is, the inverter housing portion 6c has a structure in which openings of respective recessed members face each other and one of the openings closes the other opening, and the inverter 8 is disposed at the boundary between the openings 6ca and 63h.

As illustrated in FIG. 4, the top plate portion 63ac is provided with a flow passage 8b allowing cooling water W for cooling the inverter 8 to pass therethrough. The flow passage 8b includes an introduction port 8ba and a discharge port 8bb that open to the one axial side. The introduction port 8ba and the discharge port 8bb are located on one side in the width direction. That is, the introduction port 8ba and the discharge port 8bb of the flow passage 8b are provided in the side surface of the body housing portion 63a on the one axial side. That is, the flow passage 8b has a substantially U-shaped flow passage as viewed from above in the direction of gravity.

As illustrated in FIG. 3, the top plate portion 63ac includes a recess 8h that opens downward (i.e., toward the inverter chamber 83). The recess 8h is provided in the middle of the flow passage 8b. The recess 8h has an opening covered with the switching element 8A of the inverter 8. The cooling water W flows in a region surrounded by an inner surface of the recess 8h and an upper surface of the switching element 8A. This allows the cooling water W to directly cool the switching element 8A. A gasket for sealing the cooling water W is disposed between an opening edge of the recess 8h and the switching element 8A.

According to the present embodiment, the top plate portion 63ac of the inverter housing 63 is provided with the flow passage 8b through which the cooling water W for cooling the inverter 8 flows. According to the present embodiment, weight of the flow passage 8b and the cooling water W in the flow passage 8b can be added to the inverter housing 63, so that the inverter housing 63 can be increased in rigidity. Disposing a heavy object in an upper portion of the inverter housing portion 6c enables reducing vibration of the inverter housing portion 6c. Additionally, when the flow passage 8b is provided in the inverter housing 63, the flow passage 8b exerts a function as a rib, and thus the inverter housing 63 can be increased in rigidity. As a result, the vibration of the inverter housing portion 6c can be reduced.

According to the present embodiment, the inverter housing 63 can be increased in rigidity when including the top plate portion 63ac and the side wall portion 63ad protruding from the top plate portion 63ac. This enables reducing vibration of the inverter housing 63. In the present embodiment, the side wall portion 63ad has a protruding height increasing with distance from the motor axis J2. This enables the protruding height of the side wall portion 63ad to be sufficiently increased within a range without interfering with the motor housing portion 6a, so that an effect of increasing the rigidity of the inverter housing 63 can be further enhanced.

According to the present embodiment, the flow passage 8b for cooling the inverter 8 is provided in the inverter housing 63 that is a separate member from the housing body 60 in contact with the motor 2. This causes heat of the motor 2 to be less likely to be transferred to the cooling water W, so that cooling efficiency of the inverter using the cooling water W can be enhanced. Although both the inverter 8 and the motor 2 are cooled in the motor unit 1, the inverter 8 is required to have a lower temperature than the motor 2. According to the present embodiment, the heat of the motor 2 is less likely to be transferred to the cooling water W, so that the inverter 8 can have a lower temperature than the motor 2.

In the inverter chamber 83, the inverter 8 is not in direct contact with the housing body 60. In the inverter chamber 83, a gap G is provided between the inverter 8 and the third partition wall 60ac of the housing body 60. The third partition wall 60ac is a part of the peripheral wall portion 60a surrounding the motor 2. The gap G is an air layer filled with air. Thus, the gap G functions as a heat insulating layer that suppresses heat exchange between the inverter 8 and the motor 2. This enables preventing one of the inverter 8 and the motor 2 from heating the other and interfering with operation of the other heated.

Next, placement of the switching element 8A, the capacitor 8B, and the power substrate 8C in the inverter chamber 83 will be described. First, a reference direction is defined to describe a configuration in the inverter chamber 83. In the present embodiment, the top plate portion 63ac has a thickness direction that coincides with the vertical direction (Z-axis direction). When a direction orthogonal to the motor axis J2 and the thickness direction of the top plate portion 63ac is defined as a reference direction, the reference direction coincides with the X axis. Thus, in the following description, the thickness direction of the top plate portion 63ac is simply referred to as the Z-axis direction, and the reference direction defined above is simply referred to as the X-axis direction.

The switching element 8A, the capacitor 8B, and the power substrate 8C are stacked in this order from the top plate portion 63ac toward a lower side. That is, the inverter 8 includes the switching element 8A, the capacitor 8B, and the power substrate 8C that are stacked downward in order from the top plate portion 63ac.

The switching element 8A is directly fixed to the top plate portion 63ac. The switching element 8A is a member that generates the most heat among the members constituting the inverter 8. Thus, the inverter 8 can be efficiently cooled by disposing the switching element 8A at a position closest to the top plate portion 63ac provided with the flow passage 8b through which the cooling water W flows.

The capacitor 8B is stacked below the switching element 8A. The capacitor 8B has a smaller dimension in the X-axis direction (i.e., the reference direction) than the switching element 8A. End surfaces of the switching element 8A and the capacitor 8B on an opposite side (+X side) to the motor in the X-axis direction align with each other. A part of a lower surface of the switching element 8A is exposed from the capacitor 8B. That is, the switching element 8A includes a first covered region 8Aa covered with the capacitor 8B and a first exposed region 8Ab exposed from the capacitor 8B. In the X-axis direction, the first exposed region 8Ab is located closer to the motor than the first covered region 8Aa. That is, the first exposed region 8Ab is located closer to the motor 2 than the capacitor 8B in the X-axis direction. This enables the inverter 8 to have a thickness in the Z-axis direction that decreases stepwise toward the motor 2. Thus, the inverter 8 and the motor 2 can be disposed close to each other in the direction orthogonal to the motor axis (the X-axis direction in the present embodiment), so that the entire motor unit 1 can be downsized.

As viewed in the Z-axis direction (i.e., the thickness direction of the top plate portion 63ac), the first exposed region 8Ab overlaps the motor 2. Thus, as compared with the case where the inverter 8 and the motor 2 do not overlap each other in the Z-axis direction, a dimension in a direction orthogonal to the Z-axis direction can be reduced. The inverter 8 has the smallest height dimension with respect to a back surface of the top plate portion 63ac in the first exposed region 8Ab. That is, the inverter 8 has a smaller height dimension with respect to the back surface of the top plate portion 63ac in a region overlapping the motor 2 than in other regions. This enables the motor unit 1 to be prevented from being enlarged in the Z-axis direction in the region where the inverter 8 and the motor 2 overlap each other in the Z-axis direction.

According to the present embodiment, at least a part of the inverter 8 overlaps at least a part of the motor 2 as viewed in the X-axis direction (i.e., the reference direction). Thus, as compared with the case where the inverter 8 and the motor 2 do not overlap each other in the X-axis direction, a dimension in a direction orthogonal to the X-axis direction can be reduced.

The power substrate (third member) 8C is stacked below the capacitor 8B. The power substrate 8C has a smaller dimension in the X-axis direction than the capacitor 8B. The power substrate 8C has a stacked structure with respect to the capacitor 8B, being similar to a stacked structure of the capacitor 8B with respect to the switching element 8A described above. That is, the capacitor 8B includes a second covered region 8Ba covered with the power substrate 8C and a second exposed region 8Bb exposed from the power substrate 8C. The second exposed region 8Bb is located closer to the motor 2 than the power substrate 8C in the X-axis direction. This enables the inverter 8 to have a thickness in the Z-axis direction that decreases stepwise toward the motor 2, so that the entire motor unit 1 can be downsized.

In the present embodiment, the inverter housing portion 6c overlaps at least a part of the gear unit 3 as viewed from the axial direction. More specifically, the inverter housing portion 6c overlaps the ring gear 51 of the gear unit 3 as viewed from the axial direction. That is, the inverter housing portion 6c can be disposed inside a projection area of the gear unit 3 in the axial direction, so that the entire motor 2 can be reduced in a projection dimension in the axial direction.

As illustrated in FIG. 2, the top plate portion 63ac of the body housing portion 63a is provided with a first window portion 631 and a second window portion 632 that pass through in the plate thickness direction. A first lid member 8ca and a second lid member 8cb are fixed to the top plate portion 63ac. The first window portion 631 is covered with the first lid member 8ca. The second window portion 632 is covered with the second lid member 8cb. The flow passage 8b extends between the first window portion 631 and the second window portion 632 in the front-rear direction.

The first window portion 631 is located immediately above a portion where the inverter 8 and the power supply connector 8e are fastened. A part of the first window portion 631 opens the power supply line housing portion 63b upward. A first operator inserts a tool into the inverter chamber 83 from the first window portion 631 to perform electrical connection work between the inverter 8 and the power supply connector 8e and connection work of power supply wiring housed in the power supply line housing portion 63b.

As illustrated in FIG. 3, the second window portion 632 is located immediately above the connection portion 8j between the inverter busbar 8d and the second busbar 78. The operator inserts a tool into the inverter chamber 83 from the second window portion 632 to connect the inverter busbar 8d and the second busbar 78 at the connection portion 8j.

Operation of fixing the inverter housing 63 and the housing body 60 will be described.

The inverter 8 is fixed to the inverter housing 63 in advance. The second busbar unit 77 is fixed to the housing body 60 in advance. The second busbar 78 and a first busbar 75 are also connected in advance. In this state, the inverter housing 63 is fixed to the housing body 60. Next, a tool is inserted from the second window portion 632 of the inverter housing 63 to connect the second busbar 78 and the inverter busbar 8d. Then, the second window portion 632 is covered with the second lid member 8cb. Through the above steps, the inverter housing 63 and the housing body 60 are fixed, and the inverter 8 and the motor 2 are electrically connected.

Figure 10:
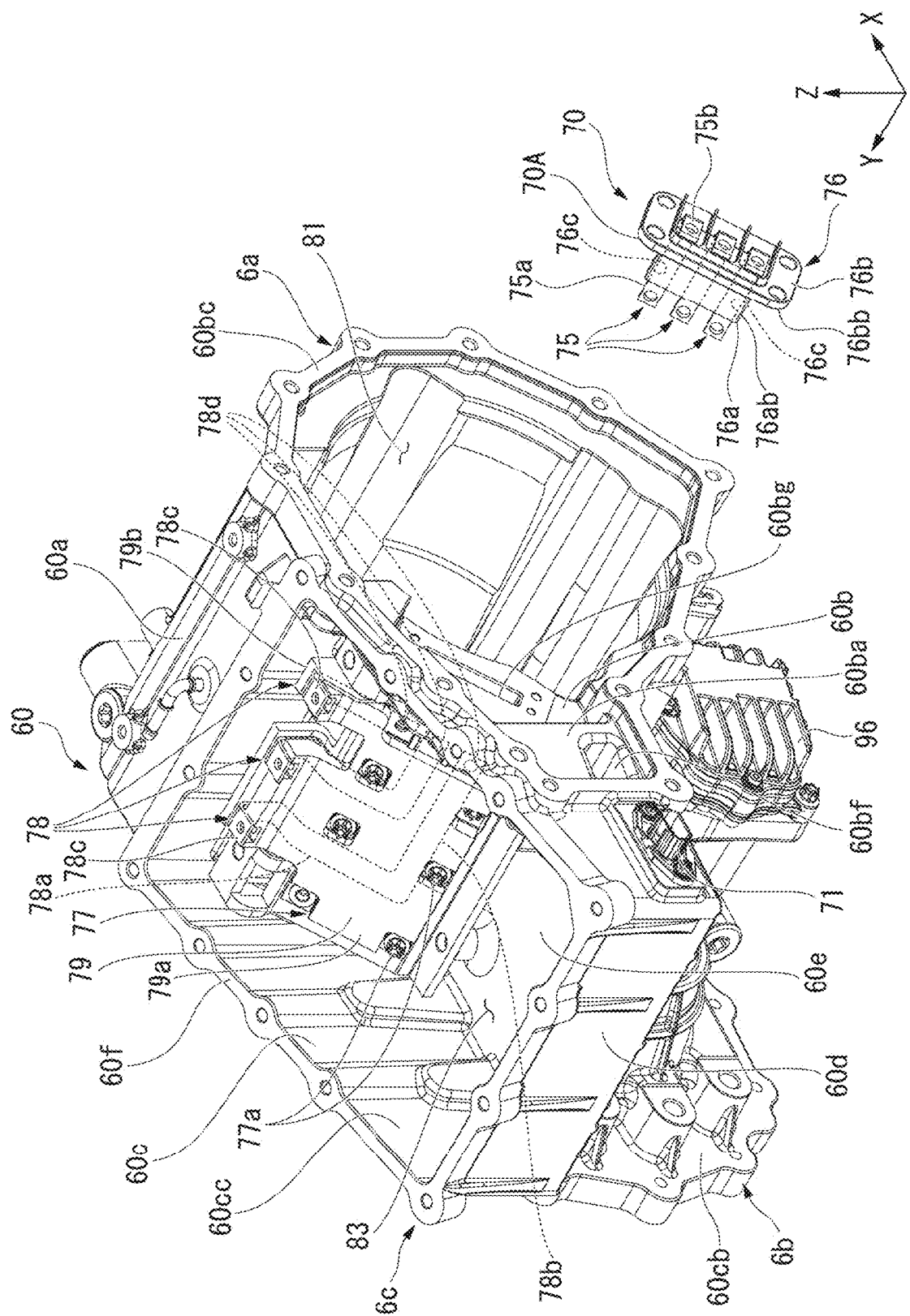
FIG. 10 is an exploded perspective view of a motor unit according to an embodiment.

FIG. 10 is an exploded perspective view of the motor unit 1.

The motor unit 1 includes the first busbar unit 70 and the second busbar unit 77 that electrically connect the motor 2 and the inverter 8.

The first busbar unit 70 includes a plurality of (three) first busbars 75, a first busbar holder 76 that holds the plurality of first busbars 75, and a seal member 70A.

A first busbar 75 is formed of a plate-shaped conductor. The three first busbars 75 are connected to respective coil wires 31b extending from coils 31 in U-phase, V-phase, and W-phase of the stator 30. The first busbar 75 is fixed to the first side plate portion 60b of the housing body 60 using the first busbar holder 76.

The first busbar 75 includes a first busbar body portion 75a extending along the axial direction and a terminal connection portion 75b located on the one axial side with respect to the first busbar body portion 75a.

The first busbar body portion 75a is inserted into a holding hole 76c provided in the first busbar holder 76. The first busbar body portion 75a has an end on the other axial side that is exposed from the first busbar holder 76. The first busbar 75 is connected to the second busbar 78 at the end of the first busbar body portion 75a on the other axial side.

The terminal connection portion 75b is bent in a plate thickness direction of the first busbar body portion 75a. The terminal connection portion 75b has a plate thickness direction that coincides with the axial direction. The terminal connection portion 75b is exposed from the first busbar holder 76. The terminal connection portion 75b is connected to the coil 31 of the motor 2. More specifically, the terminal connection portion 75b is connected to conductive wires extending from the coil 31 and bundled.

The first busbar holder 76 is made of an insulating material. In the present embodiment, the first busbar holder 76 is made of a resin material. The first busbar holder 76 includes a holder body portion 76a that holds the first busbar 75, and a holder flange section 76b that protrudes from the holder body portion 76a.

The holder body portion 76a has a quadrangular prism shape extending along the axial direction. The holder body portion 76a is inserted into the third through-hole 60bg provided in the first side plate portion 60b. The holder body portion 76a has an outer peripheral surface 76ab facing a direction orthogonal to the axial direction. The holder body portion 76a includes three holding holes 76c passing through in the axial direction.

One first busbar holder 76 is inserted into one holding hole 76c. For example, an adhesive is injected into a gap between an inner peripheral surface of the holding hole 76c and the first busbar holder 76. The adhesive blocks and seals the gap between the inner peripheral surface of the holding hole 76c and the first busbar holder 76.

The holder flange section 76b is located at an end of the holder body portion 76a on the one axial side. The holder flange section 76b protrudes from the outer peripheral surface 76ab of the holder body portion 76a along a plane orthogonal to the axial direction. The holder flange section 76b extends over one circumference of the holder body portion 76a.

The holder flange section 76b is provided with a fixing hole 76ba passing through in the axial direction. A fixing screw for fixing the first busbar unit 70 to the first side plate portion 60b of the housing body 60 is inserted into the fixing hole 76ba.

The holder flange section 76b has an opposing surface 76bb facing the other axial side. The opposing surface 76bb faces a surface of the first side plate portion 60b, facing the one axial side, with the seal member 70A interposed therebetween. The seal member 70A is sandwiched between the opposing surface 76bb and the surface of the first side plate portion 60b, facing the one axial side, in the axial direction. The seal member 70A seals a gap between the first busbar holder 76 and the first side plate portion 60b.

The second busbar unit 77 includes a plurality of (three) second busbars 78 and a second busbar holder 79 that holds the plurality of second busbars 78.

A second busbar 78 is formed of a plate-shaped conductor. The three second busbars 78 are connected to the respective first busbars 75 in U-phase, V-phase, and W-phase. The second busbar 78 is disposed in the inverter chamber 83. The second busbar 78 is fixed to the outer peripheral surface of the peripheral wall portion 60a of the housing body 60 using the second busbar holder 79. More specifically, the second busbar unit 77 is screwed to a surface of the peripheral wall portion 60a, facing the inverter chamber 83, using a plurality of fixing screws 77a.

The second busbar 78 includes an inverter-side terminal connection portion 78c connected to the inverter 8 and a motor-side terminal connection portion 78d connected to the first busbar 75. The second busbar 78 includes a second busbar body portion 78a extending in the vertical direction along the outer peripheral surface of the peripheral wall portion 60a of the housing body 60. Second busbar body portions 78a of the respective three second busbars 78 are disposed side by side along the axial direction. The second busbar body portion 78a is provided at its upper end portion with the inverter-side terminal connection portion 78c.

As illustrated in FIG. 3, the inverter-side terminal connection portion 78c is bent in a plate thickness direction of the second busbar body portion 78a. The inverter-side terminal connection portion 78c extends along the horizontal direction. The second busbar 78 is connected at the inverter-side terminal connection portion 78c to the inverter busbar 8d. The inverter busbar 8d and the inverter-side terminal connection portion 78c constitute the connection portion 8j between the inverter 8 and the second busbar.

The inverter housing 63 is provided with the second window portion 632 that exposes the connection portion 8j between the inverter 8 and the second busbar 78. The second busbar 78 electrically connects the stator 30 and the inverter 8. The present embodiment facilitates access of a tool to the inverter chamber 83 through the second window portion 632, so that the step of electrically connecting the stator 30 and the inverter 8 can be easily performed.

Figure 11:
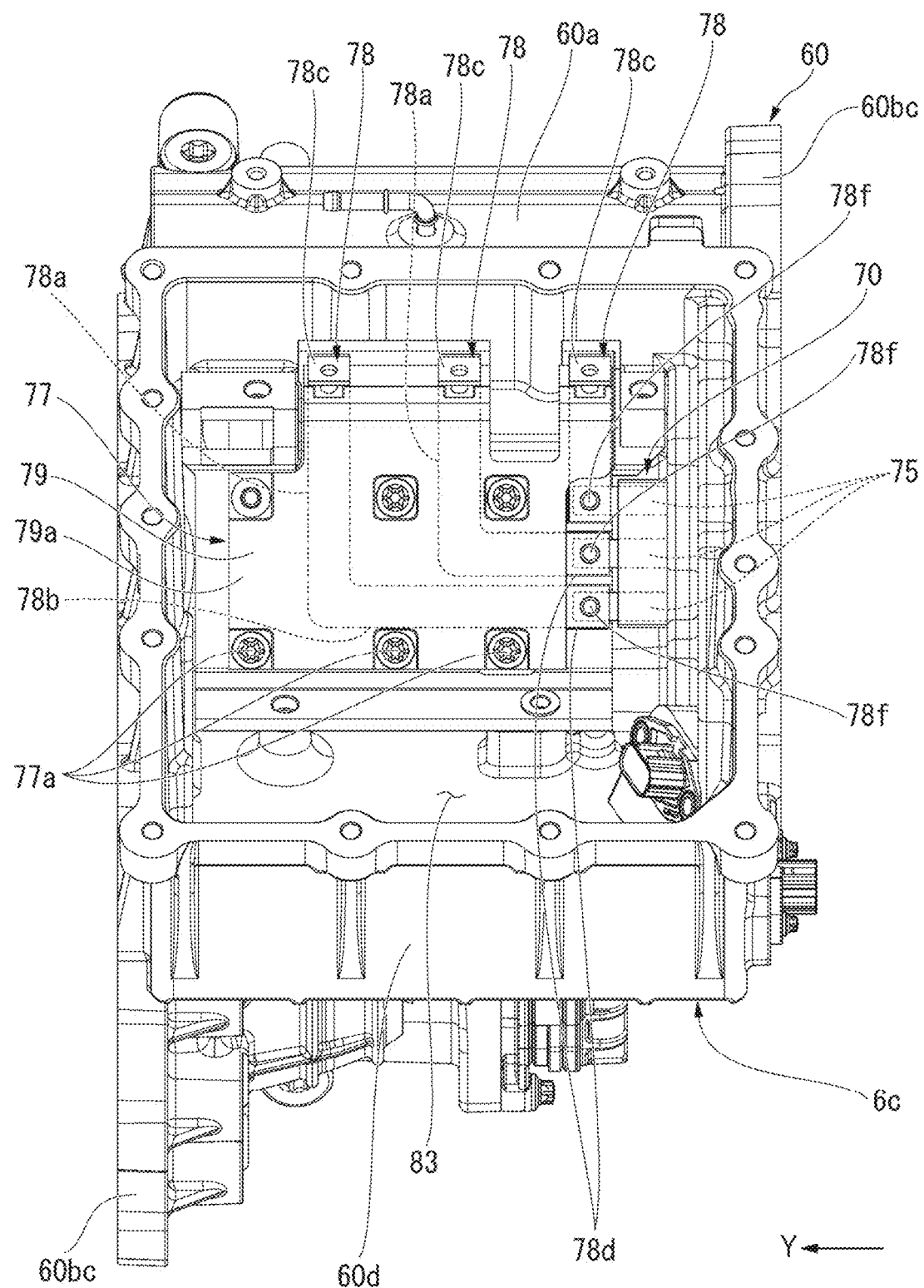
FIG. 11 is a front view of a second busbar unit disposed in an inverter chamber in a motor unit according to an embodiment.

FIG. 11 is a front view of the second busbar unit 77 disposed in the inverter chamber 83.

As described above, the first busbar 75 has an end portion on the other axial side (+Y side) that is disposed inside the inverter chamber 83 through the third through-hole 60bg. The motor-side terminal connection portion 78d of the second busbar 78 is connected to the end portion on the other axial side of the first busbar 75 inside the inverter chamber 83.

More specifically, the end portion on the other axial side of the first busbar 75 and the motor-side terminal connection portion 78d of the second busbar 78 are stacked on each other in their plate thickness directions. The end portions of the first busbar 75 and the second busbar 78, being stacked on each other, are provided with through-holes overlapping each other. A connection screw 78f is inserted into the through-holes. The first busbar 75 and the second busbar 78 are fastened and connected to each other with the connection screw 78f and a nut (not illustrated).

As illustrated in FIG. 3, the second busbar holder 79 includes a base member 79b and a cover member 79a. The base member 79b and the cover member 79a are each made of an insulating material. In the present embodiment, the base member 79b and the cover member 79a are each made of a resin material.

The base member 79b has a plate-like shape extending along the outer peripheral surface of the peripheral wall portion 60a. The base member 79b is fixed to the outer peripheral surface of the peripheral wall portion 60a inside the inverter chamber 83. The cover member 79a has a plate-like shape covering an upper surface of the base member 79b. The cover member 79a is fixed to the base member 79b. Between the cover member 79a and the base member 79b, the second busbar body portion 78a and an extension portion 78b of the second busbar 78 are sandwiched. That is, the second busbar holder 79 supports the second busbar 78 by sandwiching the second busbar 78 between the base member 79b and the cover member 79a.

As illustrated in FIG. 1, the motor unit 1 is provided with the oil passage 90 as a first cooling path and the water passage 10 as a second cooling path. The oil O flows through the oil passage (first cooling path) 90. The oil O cools the motor 2. The oil passage 90 is provided in the housing body 60. In contrast, the cooling water W flows through the water passage (second cooling path) 10. The cooling water W cools the inverter 8 and the oil O. The water passage 10 is provided in the inverter housing 63.

As illustrated in FIG. 1, the oil passage 90 is provided in the housing 6. The oil passage 90 is located in the housing space 80 in the housing 6. The oil passage 90 is formed across the motor chamber 81 and the gear chamber 82 of the housing space 80. The oil passage 90 is a path of the oil O that guides the oil O from the oil pool P (i.e., a bottom region in the housing space 80) below the motor 2 to the motor 2 and guides the oil O to the oil pool P below the motor 2 again.

In the present specification, the term, "oil passage", is a concept that means a path of the oil O circulating in the housing space 80. Thus, the "oil passage" is a concept that includes not only a "flow passage", in which oil constantly flows in one direction, but also a path (e.g., a reservoir) in which the oil is allowed to temporarily stay, and a path in which the oil drips.

The oil passage 90 includes a first oil passage 91 passing through the inside of the motor 2 and a second oil passage (oil passage) 92 passing through the outside of the motor 2. The first oil passage 91 and the second oil passage 92 are each configured to circulate the oil O inside the housing 6. The oil O cools the motor 2 from the inside and the outside by flowing through the first oil passage 91 and the second oil passage 92.

First, a common portion between the first oil passage 91 and the second oil passage 92 will be described. Each of the first oil passage 91 and the second oil passage 92 is a path for supplying the oil O from the oil pool P to the motor 2 and collecting the oil O again in the oil pool P. In each of the first oil passage 91 and the second oil passage 92, the oil O drips from the motor 2 and accumulates in a bottom region in the motor chamber 81. The oil O accumulated in the bottom region in the motor chamber 81 moves to a bottom region (i.e., the oil pool P) in the gear chamber 82 through the partition wall opening 68. That is, the first oil passage 91 and the second oil passage 92 each include a path for moving the oil O from the bottom region in the motor chamber 81 to the bottom region in the gear chamber 82.

The oil O is scraped up by the differential gear 5 from the oil pool P, and is led into the inside of the rotor 20 through the first oil passage 91. Inside the rotor 20, a centrifugal force caused by rotation of the rotor 20 is applied to the oil O. This causes the oil O to be uniformly diffused toward the stator 30 surrounding the rotor 20 from radially outward, thereby cooling the stator 30.

The first oil passage 91 includes a scraping-up path 91a, a shaft supply path 91b, an intra-shaft path 91c, and an intra-rotor path 91d. The first oil passage 91 is provided in its path with a first reservoir 93. The first reservoir 93 is provided in the gear chamber 82. The first reservoir 93 also has a function of temporarily storing a predetermined amount of the oil O.

The scraping-up path 91a is configured to allow the oil O scraped up from the oil pool P by rotation of the ring gear 51 of the differential gear 5 to be received by the first reservoir 93. The oil O accumulated in the oil pool P is scraped up by the ring gear 51. A part of the scraped oil is supplied to the first reservoir 93, and a part thereof is diffused into the gear chamber 82. The oil O diffused into the gear chamber 82 is supplied to each gear of the gear unit 3 in the gear chamber 82 to spread the oil O over tooth flanks of each gear. According to the present embodiment, the oil passage 90 passes through the gear chamber 82 (i.e., the inside of the gear housing portion 6b). This enables the oil O to be used not only for cooling the motor 2 but also for lubricating each gear and each bearing of the gear unit 3. As the oil O, an oil equivalent to an automatic transmission fluid (ATF) having a low viscosity is preferably used for exhibiting functions of a lubricating oil and a cooling oil. The oil O supplied to the tooth flanks of each gear and used for lubrication drips and is collected in the oil pool P located in a bottom of the gear chamber 82.

The shaft supply path 91b is configured to guide the oil O from the first reservoir 93 into the hollow portion 22 of the shaft 21. The intra-shaft path 91c is configured to allow the oil O to pass through inside the hollow portion 22 of the shaft 21. The intra-rotor path 91d is configured to allow the oil O to pass through the inside of the rotor core 24 from the communication hole 23 of the shaft 21 to scatter radially outward, thereby reaching the stator 30.

In the intra-shaft path 91c, a centrifugal force is applied to the oil O inside the rotor 20 as the rotor 20 rotates. This causes the oil O to be continuously scattered radially outward from the rotor 20. The scattering of the oil O causes negative pressure in the path inside the rotor 20, so that the oil O accumulated in the first reservoir 93 is sucked into the rotor 20 to fill the path inside the rotor 20 with the oil O.

The oil O having reached the stator 30 takes heat from the stator 30. The oil O having cooled the stator 30 drips downward in the stator 30 to accumulate in the bottom region in the motor chamber 81. The oil O having accumulated in the bottom region in the motor chamber 81 moves to the gear chamber 82 through the partition wall opening 68 provided in the second partition wall 60ca.

The second oil passage 92 includes a first flow passage 92a, a second flow passage 92b, a third flow passage 92c, and a fourth flow passage 92d. The second oil passage 92 is provided in its path with the pump 96, the cooler 97, and an oil pipe (supply portion) 98. The pump 96 supplies the oil O to the motor 2. The cooler 97 cools the oil O passing through the second oil passage 92. In the second oil passage 92, the oil O passes through the first flow passage 92a, the pump 96, the second flow passage 92b, the cooler 97, the third flow passage 92c, the fourth flow passage 92d, and the oil pipe 98 in this order, and is supplied to the motor 2.

Each of the first flow passage 92a, the second flow passage 92b, the third flow passage 92c, and the fourth flow passage 92d passes through a wall portion of the housing 6 surrounding the housing space 80. The first flow passage 92a allows the oil pool P in the bottom region of the housing space 80 to communicate with the pump 96. The second flow passage 92b allows the pump 96 to communicate with the cooler 97. The third flow passage 92c allows the cooler 97 to communicate with the fourth flow passage 92d, and the fourth flow passage 92d allows the third flow passage 92c to communicate with an upper region of the housing space 80.

In the present embodiment, each of the first flow passage 92a, the second flow passage 92b, the third flow passage 92c, and the fourth flow passage 92d passes through the inside of the wall portion of the housing 6 surrounding the housing space 80. Thus, when the flow passage is provided, a pipe member is not required to be separately provided. This enables contributing to a decrease in the number of components.

The pump 96 is an electric pump driven by electricity. The pump 96 sucks up the oil O from the oil pool P through the first flow passage 92a, and supplies the oil O to the motor 2 through the second flow passage 92b, the cooler 97, the third flow passage 92c, the fourth flow passage 92d, and the oil pipe 98. That is, the pump 96 is provided to circulate the oil O in the second oil passage 92.

The pump 96 has a suction port communicating with the first flow passage 92a. The pump 96 has a discharge port communicating with the second flow passage 92b. The pump 96 sucks up the oil O from the oil pool P through the first flow passage 92a, and supplies the oil O to the motor 2 through the second flow passage 92b, the cooler 97, the third flow passage 92c, the fourth flow passage 92d, and the oil pipe 98.

As illustrated in FIG. 1, a first flow passage 92a and a second flow passage 92b are connected to the cooler 97. The first flow passage 92a and the second flow passage 92b communicate with each other through an internal flow passage of the cooler 97. The cooling water pipe 11 through which the cooling water W cooled by a radiator (not illustrated) passes is connected to the cooler 97. The oil O passing through the inside of the cooler 97 is cooled by heat exchange with the cooling water W passing through the cooling water pipe 11. That is, according to the present embodiment, there is provided the cooler (heat exchanger) 97 that transfers heat of the oil O to the cooling water W. The cooling water pipe 11 is provided in its path with the inverter 8. The cooling water W having cooled the inverter 8 passes through the cooling water pipe 11. The flow passage 8b attached to the inverter housing 63 is connected to the cooling water pipe 11.

The second flow passage 92b passes through the inside of a wall portion of the motor housing portion 6a. The second flow passage 92b extends inside the wall portion of the motor housing portion 6a along the circumferential direction about the motor axis J2. The second flow passage 92b is located axially overlapping the stator 30. That is, the second flow passage 92b and the stator 30 axially overlap each other. This enables the stator 30 to be cooled by the oil O passing through the second flow passage 92b.

The third flow passage 92c passes through the inside of the wall portion of the motor housing portion 6a. According to the present embodiment, the third flow passage 92c extends inside the wall portion of the motor housing portion 6a along the circumferential direction about the motor axis J2 and the axial direction of the motor axis J2. The third flow passage 92c is located axially overlapping the stator 30. The third flow passage 92c is located radially overlapping the stator 30. That is, the third flow passage 92c and the stator 30 axially overlap each other. This enables the stator 30 to be cooled by the oil O passing through the third flow passage 92c. In particular, the oil O immediately after passing through the cooler 97 flows through the third flow passage 92c. Thus, according to the present embodiment, the stator 30 can be efficiently cooled by the oil O flowing through the third flow passage 92c. In the present embodiment, the cooler 97 is disposed downstream of the pump 96 in the second oil passage 92. However, the cooler 97 may be disposed upstream of the pump 96 in the second oil passage 92. In this case, the pump 96 is disposed in a flow passage (corresponding to the third flow passage 92c of the present embodiment) allowing the cooler 97 to communicate with an upper region of the housing space 80. Even this case enables the stator 30 to be efficiently cooled by the oil O immediately after passing through the cooler 97 when the flow passage allowing the cooler 97 to communicate with the upper region of the housing space 80 axially overlaps the stator 30.

The fourth flow passage 92d passes through the inside of the wall portion of the motor housing portion 6a. The fourth flow passage 92d opens to the motor chamber 81 and is connected to the oil pipe 98 at the opening. The fourth flow passage 92d extends along the second partition wall 60ca of the housing body 60.

As illustrated in FIG. 1, the oil pipe 98 is located in the motor chamber 81 of the housing space 80. The oil pipe 98 functions as a supply unit that supplies oil to the coil 31 and an outer peripheral surface of the core back portion 32a. That is, the oil passage 90 includes the supply unit in a pipe-like shape.

The oil pipe 98 is located above the motor 2. Oil flows through the inside of the oil pipe 98. The oil pipe 98 includes a plurality of first ejection holes 98a and a plurality of second ejection holes 98b.

The first ejection holes 98a each extend along the axial direction. The first ejection holes 98a are provided at respective ends of the oil pipe 98 in the axial direction. The first ejection holes 98a are located above the corresponding coil ends 31a. The first ejection holes 98a face the coil 31 and are provided for ejecting oil to the coil 31.

The second ejection holes 98b face the outer peripheral surface of the core back portion 32a and are provided for ejecting oil to the outer peripheral surface. The oil O ejected from the second ejection holes 98b flows downward from above along the outer peripheral surface of the motor 2 to take heat of the motor 2. This allows the entire motor 2 to be cooled.

The oil O ejected from the first ejection holes 98a and the second ejection holes 98b and having cooled the motor 2 drips downward and accumulates in the bottom region in the motor chamber 81. The oil O having accumulated in the bottom region in the motor chamber 81 moves to the gear chamber 82 through the partition wall opening 68 provided in the second partition wall 60ca.

Figure 12:
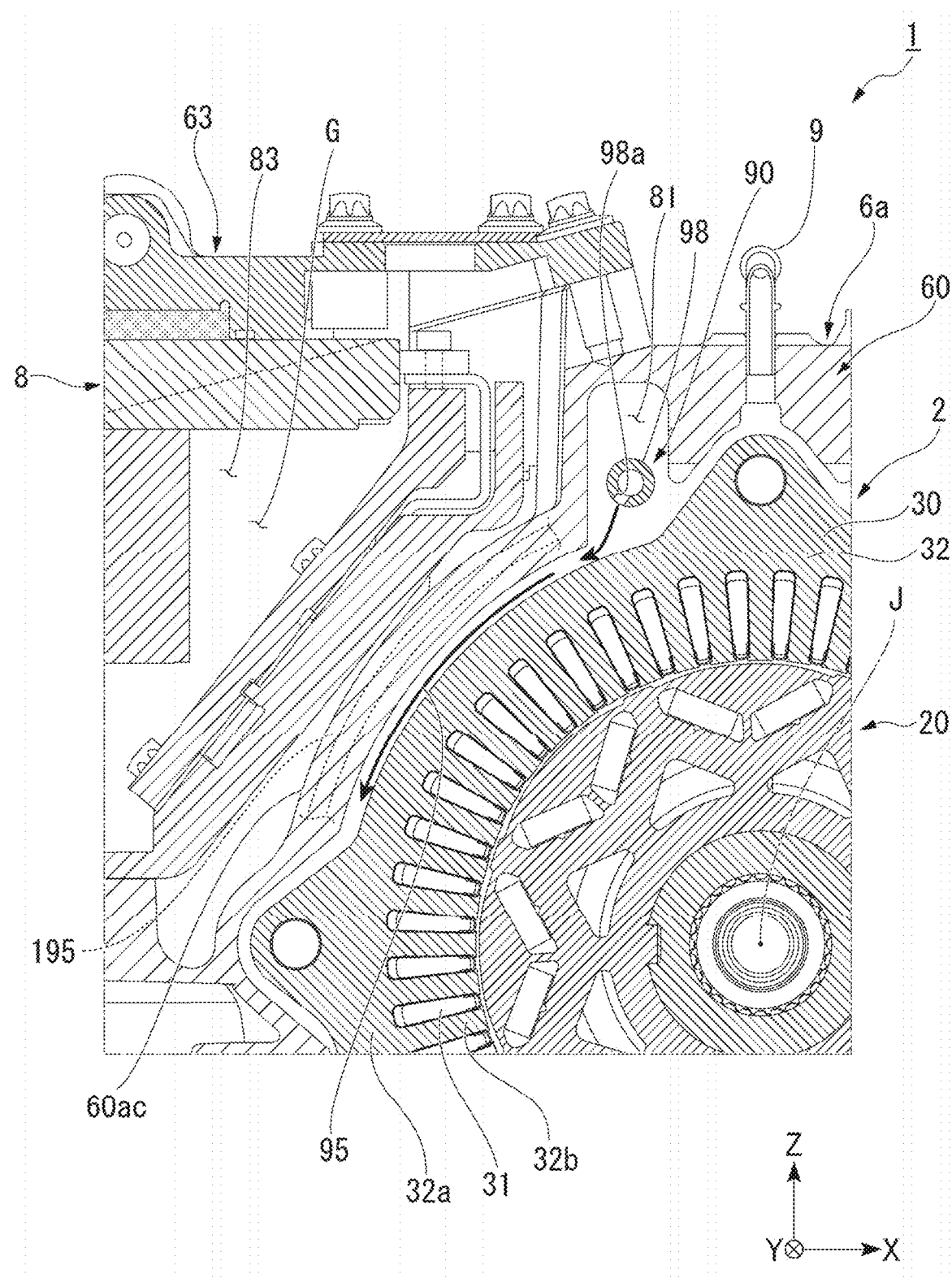
FIG. 12 is a partially enlarged view of FIG. 3.

FIG. 12 is a partially enlarged view of FIG. 3, and illustrates a path of the oil O ejected from the second ejection holes 98b.

The oil passage 90 includes a shielding flow passage 95 through which the oil O flows along an outer peripheral surface of the stator 30. The shielding flow passage 95 is located in a gap between an inner surface of the motor housing portion 6a and the outer peripheral surface of the stator 30. The shielding flow passage 95 allows the oil O ejected from the second ejection hole 98b to flow therethrough. That is, the oil O flowing through the shielding flow passage 95 flows downward from above along the outer peripheral surface of the core back portion 32a. At least a part of the shielding flow passage 95 passes through between the outer peripheral surface of the stator 30 and the inverter 8. The oil O absorbs heat from the outer peripheral surface of the stator 30 when passing through the shielding flow passage 95. According to the present embodiment, when the shielding flow passage 95 for cooling the outer peripheral surface of the stator 30 is provided between the outer peripheral surface of the stator 30 and the inverter 8, the outer peripheral surface of the stator 30 is cooled by the oil O, and thus transfer of heat from the stator 30 to the inverter 8 can be reduced. Even when the inverter 8 has a high temperature, transfer of heat from the inverter 8 to the motor 2 can also be reduced. That is, according to the present embodiment, providing the shielding flow passage 95 enables preventing one of the inverter 8 and the motor 2 from heating the other and interfering with operation of the other heated.

FIG. 12 illustrates a shielding flow passage 195 of a modification, which can be used in the present embodiment, with a broken line. The shielding flow passage 195 of the modification passes through the inside of the third partition wall 60ac that partitions the inverter chamber 83 and the motor chamber 81. When the shielding flow passage 195 of the modification is used, an effect of shielding heat between the motor 2 and the inverter 8 can be enhanced as compared with the shielding flow passage 95 of the embodiment.

As illustrated in FIG. 1, the water passage 10 is provided in the housing 6. The water passage 10 includes the flow passage 8b passing through the inside of the housing 6 and the cooling water pipe 11 passing through the outside of the housing 6. As described above, the cooler 97 is disposed in the path of the water passage 10.

According to the present embodiment, the motor unit 1 includes a refrigerant (oil O) for cooling the motor 2 and a refrigerant (cooling water W) for cooling the inverter 8. That is, according to the present embodiment, the oil passage 90 as the first cooling path and the water passage 10 as the second cooling path are provided independently of each other. This enables selecting an optimum refrigerant for cooling the corresponding one of the motor 2 and the inverter 8 in accordance with the amount of heat generated by the motor 2 and the inverter 8, so that the motor 2 and the inverter 8 can be efficiently cooled. Additionally, the respective cooling paths are independent. Thus, even when one of the motor 2 and the inverter 8 has a higher temperature than the other, transfer of heat from the one to the other can be reduced using the refrigerant. This enables controlling the respective cooling paths independently in accordance with temporal temperature change of the motor 2 and the inverter 8, so that the motor 2 and the inverter 8 can be effectively cooled.

According to the present embodiment, the refrigerant (oil O) for cooling the motor 2 and the refrigerant (cooling water W) for cooling the inverter 8 are provided in different members (the housing body 60 and the inverter housing 63). This enables reducing transfer of heat of the motor 2 to the cooling water W and transfer of heat of the inverter 8 to the oil O. Thus, the motor 2 can be efficiently cooled by the oil O and the motor 2 can be efficiently cooled by the cooling water W.

Although in the present embodiment, a case is described where the oil O is used as the first refrigerant and the cooling water W is used as the second refrigerant, the present invention is not limited thereto. For example, both the first refrigerant and the second refrigerant may be oils O. Even in this case, the oils flowing inside respective paths need not to be mixed with each other by providing the first cooling path (oil passage 90) and the second cooling path (water passage 10) independently from each other.

Although the embodiment of the present invention and the modifications thereof have been described above, each structure, a combination thereof, and the like in the embodiment are merely examples, and addition, elimination, replacement, and other changes of the structure can be made within a range without departing from the spirit of the present invention. Then, the present invention is not limited by the embodiment.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor unit comprising:
a motor that rotates about a motor axis;
a gear unit connected to the motor;
an inverter that controls a current to be supplied to the motor; and
a housing including a motor housing portion that houses the motor, an inverter housing portion that houses the inverter, and a gear housing portion that houses the gear unit,
the inverter housing portion being supported by the motor housing portion and the gear housing portion,
the housing including a housing body that is a single member,
the housing body including:
a first wall portion that also serves as a side wall of each of the inverter housing portion and the motor housing portion; and
a second wall portion that also serves as a side wall of each of the inverter housing portion and the gear housing portion,
the inverter housing portion includes a top plate portion covering an opening of the inverter housing portion,
the inverter is fixed to a back surface of the top plate portion, and faces an inside of the inverter housing portion,
the inverter housing portion includes a sidewall portion protruding from an edge portion of the top plate portion along a thickness direction of the top plate portion, and
the sidewall portion has a protruding height increasing as a distance from the motor axis increases.

2. A motor unit comprising:
a motor that rotates about a motor axis;
a gear unit connected to the motor;
an inverter that controls a current to be supplied to the motor; and
a housing including a motor housing portion that houses the motor, an inverter housing portion that houses the inverter, and a gear housing portion that houses the gear unit,
the inverter housing portion being supported by the motor housing portion and the gear housing portion,
the housing including a housing body that is a single member,
the housing body including:
a first wall portion that also serves as a side wall of each of the inverter housing portion and the motor housing portion; and
a second wall portion that also serves as a side wall of each of the inverter housing portion and the gear housing portion,
the inverter housing portion includes a top plate portion covers an opening of the inverter housing portion,
the inverter being fixed to a back surface of the top plate portion, and faces an inside of the inverter housing portion, and
the inverter has a smaller height dimension with respect to the back surface of the top plate portion in a region overlapping the motor as viewed from a thickness direction of the top plate portion than in another region of the inverter.

3. The motor unit according to claim 2, further comprising:
a power supply connector for supplying power to the inverter, being connected to the inverter,
wherein the housing includes:
a power supply line housing portion that protrudes from a side surface of the inverter housing portion and supports the power supply connector; and
a reinforcing portion that reinforces the power supply line housing portion.

4. The motor unit according to claim 2, wherein the inverter housing is provided with a flow passage through which a refrigerant for cooling the inverter flows.

5. The motor unit according to claim 2, wherein
the housing includes a closing part configured to cover the motor on one axial side,
the inverter is disposed close to an outer peripheral surface of the motor,
the gear unit is disposed on another axial side with respect to the motor, and
the inverter housing portion includes a third wall portion to which the closing part is fastened.

6. The motor unit according to claim 5, wherein the closing part includes a sensor housing portion that internally houses a rotation angle sensor.

7. The motor unit according to claim 5, wherein the closing part includes a shaft holding portion that holds an output shaft of the gear unit.

8. The motor unit according to claim 7, wherein the shaft holding portion is provided integrally with the closing part.

9. The motor unit according to claim 5, wherein the closing part includes a support part that holds a cable or a pipe.

* * * * *